(12) United States Patent
Yang et al.

(10) Patent No.: US 12,342,346 B2
(45) Date of Patent: Jun. 24, 2025

(54) METHOD AND APPARATUS FOR SUPPORTING A PLURALITY OF CONFIGURED GRANTS IN WIRELESS COMMUNICATION SYSTEM

(71) Applicant: Innovative Technology Lab Co., Ltd., Seoul (KR)

(72) Inventors: Hyo Sun Yang, Seoul (KR); Ki Bum Kwon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 607 days.

(21) Appl. No.: 17/487,253

(22) Filed: Sep. 28, 2021

(65) Prior Publication Data

US 2022/0015135 A1   Jan. 13, 2022

Related U.S. Application Data

(63) Continuation of application No. PCT/KR2020/004199, filed on Mar. 27, 2020.

(30) Foreign Application Priority Data

Mar. 28, 2019  (KR) .................. 10-2019-0036365

(51) Int. Cl.
*H04W 72/23* (2023.01)
*H04L 1/1812* (2023.01)
*H04L 5/00* (2006.01)

(52) U.S. Cl.
CPC .......... *H04W 72/23* (2023.01); *H04L 1/1812* (2013.01); *H04L 5/0098* (2013.01)

(58) Field of Classification Search
CPC ..... H04W 72/23; H04W 72/56; H04W 72/02; H04W 72/53; H04W 72/569; H04L 1/1812; H04L 5/0098; H04L 5/001; H04L 5/0064; H04L 5/0091; H04L 1/1874; H04L 1/1822
See application file for complete search history.

(56) References Cited

U.S. PATENT DOCUMENTS

| | | | |
|---|---|---|---|
| 2017/0367087 A1* | 12/2017 | Seo | .................. H04W 72/51 |
| 2018/0049193 A1 | 2/2018 | Belleschi et al. | |
| 2018/0279331 A1* | 9/2018 | Shaheen | ............... H04W 72/23 |

FOREIGN PATENT DOCUMENTS

| | | |
|---|---|---|
| CN | 107734703 A | 2/2018 |
| CN | 108207032 A | 6/2018 |

(Continued)

OTHER PUBLICATIONS

International Search Report for International Patent Application No. PCT/KR2020/004199, dated Jul. 2, 2020.

(Continued)

*Primary Examiner* — Dady Chery

(57) ABSTRACT

The present disclosure can provide a method in which a terminal performs transmission in a wireless communication system. The method for performing transmission can comprise the steps in which: a terminal receives a plurality of pre-configured resources; the device confirms as to whether the plurality of pre-configured resources collide; the terminal selects any one pre-configured resource among a plurality of collided pre-configured resources; and transmission for the selected preconfigured resource is performed.

18 Claims, 12 Drawing Sheets

(56) References Cited

FOREIGN PATENT DOCUMENTS

| CN | 109391344 A | 2/2019 |
|---|---|---|
| WO | 2017171528 A1 | 10/2017 |

OTHER PUBLICATIONS

Written Opinion for International Patent Application No. PCT/KR2020/004199, dated Jul. 2, 2020.

"3rd Generation Partnership Project; Technical Specification Group Radio Access Network; NR; NR and NG-RAN Overall Description; Stage 2 (Release 15)", 3GPP TS 38.300 V15.4.0, Dec. 2018, pp. 1-97, 3GPP Organizational Partners.

"3rd Generation Partnership Project; Technical Specification Group Radio Access Network; NR; Medium Access Control (MAC) protocol specification (Release 15)", 3GPP TS 38.321 V15.4.0, Dec. 2018, pp. 1-77, 3GPP Organizational Partners.

"3rd Generation Partnership Project; Technical Specification Group Radio Access Network; NR; Radio Resource Control (RRC) protocol specification (Release 15)", 3GPP TS 38.331 V15.4.0, Dec. 2018, pp. 1-329, 3GPP Organizational Partners.

ASUSTeK, "Intra UE prioritization for UL grants", 3GPP TSG-RAN WG2 Meeting #105, R2-1901039, Athens, Greece, Feb. 25-Mar. 1, 2019.

Fraunhofer IIS, "On Support of UL grantfree transmission", 3GPP TSG RAN WG1 Meeting AH1901, R1-1901233, Taipei, Taiwan, Jan. 21-25, 2019.

NTT Docomo, Inc., "Offline summary for AI 7.3.3.4 UL data transmission procedure", 3GPP TSG RAN WG1 Meeting #91, R1-1721510, Reno, USA, Nov. 27-Dec. 1, 2017.

Nokia et al., "Summary of Friday offline discussion on UL/DL intra-UE prioritization/multiplexing", 3GPP TSG-RAN WG1 #96, R1-1903818, Athens, Greece, Feb. 25-Mar. 1, 2019.

Panasonic, "Discussion on URLLC enhancements for grant-free transmission", 3GPP TSG RAN WG1 Ad-Hoc Meeting 1901, R1-1901291, Taipei, Taiwan, Jan. 21-25, 2019.

Sony, "Consideration on UL Intra-UE Tx Multiplexing", 3GPP TSG RAN WG1 #96, R1-1902182, Athens, Greece, Feb. 25-Mar. 1, 2019.

Extended European Search report for Application No. 20777075.1-1215/3958499 PCT/KR2020004199. Dated Nov. 24, 2022.

Examination Report from Intellectual Property India for Application No. 202117042771 dated Feb. 12, 2024.

"Discussion on HARQACK codebook for NR-U", Samsung, 3GPP TSG RAN WG1 Ad-Hoc Meeting 1901, R1-1901039, Taipei, Taiwan. Publication Date: Jan. 25, 2019.

3GPP Tsg Ran WG1 #96 R1-1902810 Athens, Greece, Feb. 25-Mar. 1, 2019 Title: UL intra-UE transmission prioritization/multiplexing Source: NTT Docomo, Inc. Agenda Item: 7.2.6.4.

* cited by examiner

FIG. 5
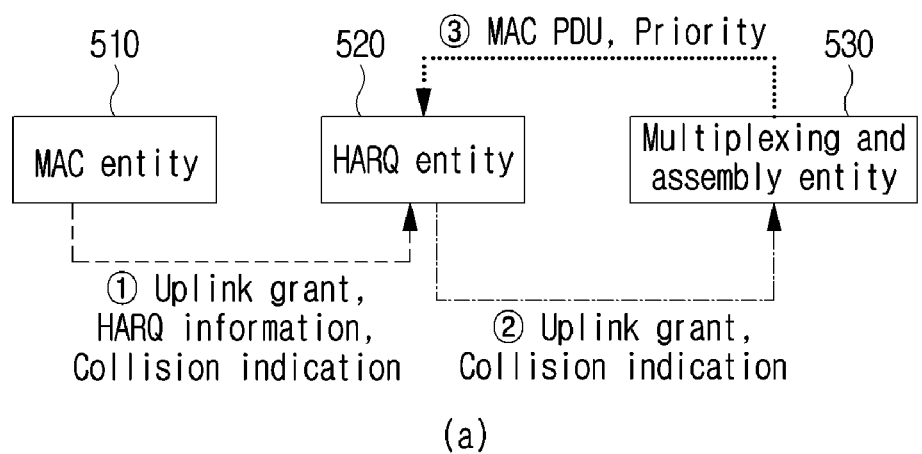
(a)
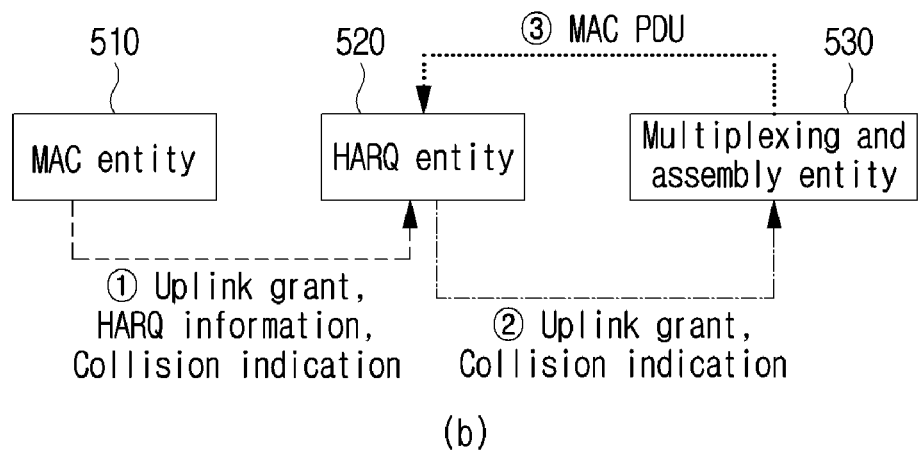
(b)

METHOD AND APPARATUS FOR SUPPORTING A PLURALITY OF CONFIGURED GRANTS IN WIRELESS COMMUNICATION SYSTEM

CROSS-REFERENCE TO RELATED APPLICATIONS

This application is a continuation of pending PCT International patent application No. PCT/KR2020/004199, filed on Mar. 27, 2020, which claims priority from and the benefit of Korean Patent Application No. 10-2019-0036365, filed on Mar. 28, 2019, each of which is hereby incorporated by reference in its entirety.

TECHNICAL FIELD

The present disclosure relates to a method and apparatus for supporting a plurality of configured grants in a wireless communication system and, more particularly, to a method and apparatus for configuring, by a user equipment (UE) supporting Ultra Reliable and Low Latency Communications (URLLC) and Industrial Internet of Things (IIoT), a plurality of configured grants.

RELATED ART

International Mobile Telecommunication (IMT) framework and standard are being developed in the International Telecommunication Union (ITU). Also, in the recent times, discussion for 5-th generation (5G) communication is ongoing through a program called "IMT for 2020 and beyond."

To meet the requirements requested by "IMT for 2020 and beyond," discussion is being made to support various numerologies about a time-frequency resource unit standard by considering various scenarios, service requirements, and potential system compatibility in a 3-rd Generation Partnership Project (3GPP) new radio (NR) system.

DETAILED DESCRIPTION

Technical Subject

The present disclosure may provide a method and apparatus for supporting a plurality of configured grants.

The present disclosure may provide a method and apparatus for configuring, by a user equipment (UE) supporting Ultra Reliable and Low Latency Communications (URLLC) and Industrial Internet of Things (IIoT), a plurality of configured grants.

The present disclosure may provide a method and apparatus for selecting, by a UE, a single configured grant and transmitting data if a plurality of configured grants collides.

The present disclosure may provide a method and apparatus for retransmitting, by a UE, data of which transmission is omitted through an omitted configured grant if a plurality of configured grants collides.

Technical Solution

According to an example of the present disclosure, there may be provided a method of performing, by a user equipment (UE), transmission in a wireless communication system. Here, the method of performing transmission may include receiving, by the UE, a plurality of configured grants, wherein the receiving includes receiving a configured grant for at least one service configured in a single bandwidth part (BWP), the configured grant is configured for each service, and at least one configured grant is configured for the service; verifying, by the UE, whether a collision occurs between the plurality of configured grants, wherein the verifying includes verifying whether transmission points in times for transmitting traffic overlap between the services; selecting, by the UE, a single configured grant from among the colliding plurality of configured grants, wherein the selecting of the single configured grant includes a process of verifying priority for the service from a radio resource control (RRC) message received from the base station and a process of selecting a configured grant based on the verified priority, and further includes a process of selecting an initially configured grant based on time order when transmission points in times of traffic for the same service overlap; and transmitting traffic for a corresponding service using the selected configured grant.

Also, according to an example of the present disclosure, in the receiving of the configured grant, a first BWP supports services A, B, and C, the configured grant is configured for each of the services A, B, and C, and at least one configured grant is configured for each of the services A, B, and C, a second BWP supports services D and E, the configured grant is configured for each of the services D and E, and at least one configured grant is configured for each of the services D and E, and the receiving of the configured grant includes a process of activating, by the UE, a BWP indicated by a BWP indicator included in a Physical Direct Control Channel (PDCCH) received from the base station and inactivating a BWP not indicated between the first BWP and the second BWP.

Also, according to an example of the present disclosure, the services A, B, and C and the services D and E may indicate the same service.

Also, according to an example of the present disclosure, the receiving of the configured grant may include verifying a transmission point in time of traffic for each of the services A, B, and C using the configured grant for each of the services A, B, and C of the activated first BWP; and verifying whether transmission points in times of traffic overlap among the services A, B, and C.

Also, according to an example of the present disclosure, the method may further include a process of receiving an uplink grant from the base station using a configured scheduling radio network temporary identifier (CS-RNTI) for retransmission of a configured grant configured for the UE, and a process of transmitting traffic for a service corresponding to a dropped configured grant using the received uplink grant.

Here, according to an example of the present disclosure, the process of transmitting the traffic for the service may include a process of receiving allocation of a retransmission grant addressed to the CS-RNTI, and a process of verifying retransmission of traffic for a corresponding service by verifying a Hybrid Automatic Request and Repeat (HARP) process identifier (ID) of the retransmission grant.

Also, according to an example of the present disclosure, the method may further include a process of receiving an uplink grant from the base station using a C-RNTI and a process of transmitting traffic for a service corresponding to a dropped configured grant using the received uplink grant.

Features briefly described above in relation to the present disclosure are merely example aspects of the following detailed description and do not limit the scope of the present disclosure.

Effect

According to the present disclosure, there may be provided a method and apparatus for supporting a plurality of configured grants.

According to the present disclosure, there may be provided a method and apparatus for configuring, by a user equipment (UE) supporting Ultra Reliable and Low Latency Communications (URLLC) and Industrial Internet of Things (IIoT), a plurality of configured grants.

According to the present disclosure, there may be provided a method and apparatus for selecting, by a UE, a single configured grant and transmitting data if a plurality of configured grants collides.

According to the present disclosure, there may be provided a method and apparatus for retransmitting, by a UE, data of which transmission is omitted through an omitted configured grant if a plurality of configured grants collides.

Effects achievable from the present disclosure are not limited to the aforementioned effects and still other effects not described herein may be clearly understood by one of ordinary skill in the art to which the present disclosure pertains from the following description.

BRIEF DESCRIPTION OF DRAWINGS

FIG. 5 illustrates an uplink transmission operation of a UE according to the present disclosure.

BEST MODE TO CARRY OUT THE INVENTION

Figure 1:
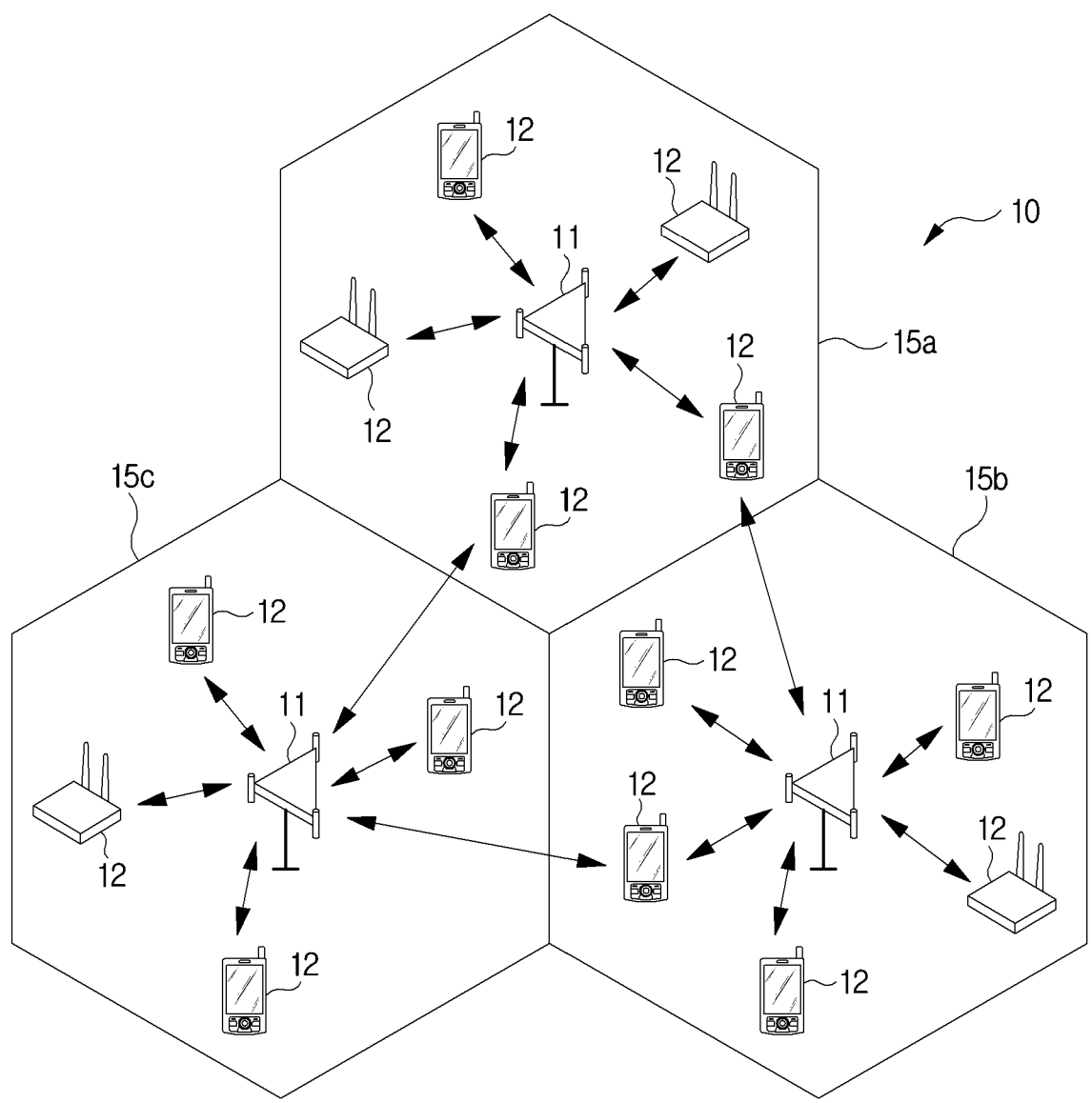
FIG. 1 illustrates a wireless communication system according to the present disclosure.

According to an example of the present disclosure, there may be provided a method of performing, by a user equipment (UE), transmission in a wireless communication system. Here, the method of performing transmission may include receiving, by the UE, a plurality of configured grants, wherein the receiving includes receiving a configured grant for at least one service configured in a single bandwidth part (BWP), the configured grant is configured for each service, and at least one configured grant is configured for the service; verifying, by the UE, whether a collision occurs between the plurality of configured grants, wherein the verifying includes verifying whether transmission points in times for transmitting traffic overlap between the services; selecting, by the UE, a single configured grant from among the colliding plurality of configured grants, wherein the selecting of the single configured grant includes a process of verifying priority for the service from a radio resource control (RRC) message received from the base station and a process of selecting a configured grant based on the verified priority, and further includes a process of selecting an initially configured grant based on time order when transmission points in times of traffic for the same service overlap; and transmitting traffic for a corresponding service using the selected configured grant.

Detailed Description of the Illustrated Embodiment

Various examples of the present disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

In describing the examples, detailed description on known configurations or functions may be omitted for clarity and conciseness. Throughout the drawings and the detailed description, unless otherwise described, the same drawing reference numerals are understood to refer to the same elements, features, and structures.

In the present disclosure, it will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

In the present disclosure, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

In present disclosure, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

In the present disclosure, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

Further, the description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

In the present disclosure, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto.

For example, a new radio (NR) system supports various subcarrier spacings (SCSs) by considering various scenarios, service requirements, potential system compatibility, and the like. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC). Here, the term "NR system" used herein is used as an example of a wireless communication system, and the term "NR system" itself is not limited to the aforementioned features.

Also, for example, 5-th generation (5G) mobile communication technology may be defined. Here, 5G mobile communication technology may be defined by including the existing Long Term Evolution-Advanced (LTE-A) system as well as the aforementioned NR system. That is, 5G mobile communication technology may operate by considering backward compatibility with a previous system as well as a newly defined NR system.

For example, a sidelink field of 5G may include all of sidelink technology in an LTE system and sidelink technology in an NR system. Here, the sidelink field may be essential to enhance a performance and to integrate various services through an ultra high reliability and an ultra low latency.

FIG. 1 is a diagram illustrating a wireless communication system to which the present disclosure is applied.

The network structure illustrated in FIG. 1 may be the network structure of NG-RAN(Next Generation Radio Access Network) or Evolved-Universal Mobile Telecommunications System (E-UMTS). NG-RAN or E-UMTS may include the long term evolution (LTE) system, the LTE-A system, or the like, or may include the 5G mobile communication network, new radio (NR), or the like.

Referring to FIG. 1, in a wireless communication system 10, a base station (BS) 11 and a user equipment (UE) 12 may wirelessly perform transmission and reception of data. Also, the wireless communication system 10 may support device-to-device (D2D) communication between UEs. Also, for example, the wireless communication system 10 may support Vehicle-to-everything (V2X) communication. The following may include all of the concept of a terminal device used by a general user and a terminal device mounted to a vehicle, such as, for example, a smartphone for the aforementioned UE.

Also, for example, the BS 11 in the wireless communication system 10 may provide a communication service to a UE placed in the coverage of the BS 11 via a predetermined frequency band. The coverage within which a BS provides a service is also referred to as a site. The site may include various areas 15a, 15b, and 15c, which may be referred to as sectors. The sectors included in the site may be identified by different identifiers. Each sector 15a, 15b, and 15c may be construed as a part of the area that the BS 11 covers.

Also, for example, the BS 11 may generally refer to a station that communicates with the UE 12, and may be referred to as an evolved-NodeB (eNodeB), gNodeB, ng-eNB, a base transceiver system (BTS), an access point, a femtoeNodeB, a home eNodeB (HeNodeB), a relay, a remote radio head (RRH), DU (Distributed Unit) or the like.

The UE 12 may be a stationary or mobile entity, and may be referred to as a mobile station (MS), a mobile terminal (MT), a user terminal (UT), a subscriber station (SS), a wireless device, a personal digital assistant (PDA), a wireless modem, a handheld device, or the like.

Also, the BS 11 may be referred to as "megacell," "macrocell," "microcell," "picocell," "femtocell," or the like based on the size of coverage provided by the corresponding BS. A cell may be used as a term for indicating a frequency band that a BS provides, the coverage of a BS, or a BS.

Hereinafter, a downlink (DL) indicates communication or a communication path from the BS 11 to the UE 12, and an uplink (UL) indicates communication or a communication path from the UE 12 to the BS 11. In the downlink, a transmitter may be a part of the BS 11, and a receiver may be a part of the UE 12. In the uplink, a transmitter may be a part of the UE 12, and a receiver may be a part of the BS 11.

A multiple access scheme applied to the wireless communication system 10 is not limited to a specific scheme. For example, the wireless communication system may utilize various multiple access schemes, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, OFDM-CDMA, and the like.

Uplink transmission and downlink transmission may be performed based on a time division duplex (TDD) scheme that performs transmission at different times, or based on a frequency division duplex (FDD) scheme that performs transmission at different frequencies.

Also, the TDD scheme that performs transmission at different times may be used for uplink transmission and downlink transmission. Also, the FDD scheme that performs transmission at different frequencies may be used for uplink transmission and downlink transmission. Also, a half-FDD scheme that performs uplink transmission and downlink at different frequencies and at different times may be used.

The following Table 1 may show abbreviations used in relation to the present disclosure. Here, for example, the terms disclosed in Table 1 may be identical to abbreviations used in LTE and LTE-A. Also, for example, in the following Table 1, gNB may be used to be distinguished from eNB as a base station of LTE. Here, the base station may refer to at least one of the aforementioned gNB and eNB. In the following, although the base station is used for clarity of description, the following base station may be gNB or eNB. However, it is provided as an example only.

TABLE 1

AS: Access Stratum
BSR: Buffer Status Reporting
CBR: Channel Busy Ratio
CG: Configured Grant
CS-RNTI: Configured Scheduling RNTI
eMBB: evolved Mobile BroadBand
gNB: g-NodeB
LCP: Logical Channel Prioritization
MAC: Medium Access Control
MCS: Modulation and Coding Scheme
mMTC: massive Machine Type Communication
RAN: Radio Access Network
RLC: Radio link Control
RNTI: Radio Network Temporary Identifier
PDCP: Packet Data Convergence Protocol
PDU: Protocol Data Unit
QoS: Quality of Service
RRC: Radio Resource Control
TSN: Time Sensitive Networking
URLLC: Ultra Reliability Low Latency Communication Also, an NR numerology is described as an NR system. For example, the NR numerology may indicate a numerical value of a basic element or factor that generates a resource grid on a time-frequency domain for design of the NR system. For example, in a numerology of a 3GPP LTE/LTE-A system, a subcarrier spacing may correspond to 15 kilohertz (kHz) (or 7.5 kHz in the case of Multicast-Broadcast Single-Frequency Network (MBSFN)) or an extended CP. Here, the subcarrier spacing is only a single example and the meaning of the term "numerology" does not restrictively indicate only the subcarrier spacing. The meaning of the term "numerology" may include at least one of a Cyclic Prefix (CP) length, a Transmit Time Interval (TTI) length, a number of Orthogonal Frequency Division Multiplexing (OFDM) symbols within a desired time interval, and a duration of a single OFDM symbol, associated with the subcarrier spacing (or determined based on the subcarrier spacing). That is, different numerologies may be distinguished from each other based on a case in which at least one of the subcarrier spacing, the CP length, the TTI length, the number of OFDM symbols within the desired time interval, and the duration of the single OFDM symbol has a different value.

Here, for example, the NR system may use a plurality of numerologies in various scenarios, various service requirements, compatibility with a potential new system, and the like. In detail, since current numerologies of wireless communication systems may not readily support a higher frequency band, a faster movement speed, and lower latency, a new numerology may need to be defined.

For example, the NR system may support applications, such as enhanced Mobile Broadband (eMBB) that may use a ultra-wideband, massive Machine Type Communications/Ultra Machine Type Communications (mMTC/uMTC) that may use a plurality of low power devices, Ultra-Reliable and Low Latency Communications (URLLC) that requires low latency. In particular, the requirements for user plane latency on the URLLC or eMBB service may be 0.5 ms in an uplink and 4 ms in all of uplink and downlink, which may be requirements for a significant latency decrease compared to latency of 10 ms required in the 3GPP LTE and LTE-A system.

Various numerologies need to be supported to meet such various scenarios and various requirements in a single NR system. In particular, a plurality of subcarrier spacings (SCSs) may need to be supported, which differs from an aspect that a single SCS is supported in the existing LTE/LTE-A systems.

A new numerology for the NR system, which includes supporting the plurality of SCSs, may be applied to resolve an issue that a wide bandwidth is unavailable in an existing carrier or frequency range of, e.g., 700 megahertz (MHz) or 2 gigahertz (GHz). For example, an SCS may be differently determined with the assumption of a wireless communication system that operates in a carrier or a frequency range of 6 GHz or more or 40 GHz or more. However, the scope of the present disclosure is not limited thereto. That is, in the NR system, a different SCS may be configured based on a frequency domain being used, without being limited to the aforementioned example.

Also, for example, to overcome a poor channel environment, such as high pathloss, phase-noise, and frequency offset, occurring on a high carrier frequency, the NR system may use transmission of a synchronization signal, a random access signal, and a broadcast channel through a plurality of beams.

Also, the NR system may use carrier aggregation (CA). The carrier aggregation may indicate aggregating and using at least two component carriers (CCs) or cells to support a wide transmission bandwidth. Here, data packets may be transmitted or received using a single CC or a plurality of CCs depending on capability of a UE. When a carrier aggregation is configured for at least two cells, the at least two cells may include a primary cell (PCell) and at least one secondary cell (SCell).

Here, for example, in a hierarchical structure of the UE in which the carrier aggregation is configured, the UE may have a single unit MAC entity.

Meanwhile, the NR system may use a dual connectivity (DC) structure. The dual connectivity represents an operation in which the UE may simultaneously connect to a master base station and a secondary base station. The UE in which the dual connectivity is configured may have a hierarchical structure of the UE for a hierarchical structure of the master base station and a hierarchical structure of the UE for a hierarchical structure of the secondary base station.

For example, the UE in which the dual connectivity is configured may have two MAC entities, such as a MAC entity for a master cell group (MCG) that is a group of serving cells related to the master base station and a MAC entity for a secondary cell group (SCG) that is a group of serving cells related to the secondary base station.

Here, for example, when at least two cells are configured in the MCG, the at least two cells may include a PCell and an SCell. Also, when at least two cells are configured in the SCG, the at least two cells may include a primary secondary cell (PSCell) and an SCell. Here, for example, the PCell of the MCG and the PSCell of the SCG may be commonly defined as a special cell (SpCell). That is, the SpCell may represent the PCell of the MCG or the PSCell of the SCG depending on whether the MAC entity is associated with the MCG or the SCG. Hereinafter, related description is made using the SpCell based on the aforementioned description. As described above, it may represent the PCell of the MCG or the PSCell of the SCG.

Also, the NR system may use a bandwidth part (hereinafter, a BWP). For example, when the UE performs transmission and reception of a signal, a frequency bandwidth to be used may have no need to be as wide as a bandwidth of a serving cell. Here, as a BWP, the bandwidth may be configured as a narrower bandwidth than the bandwidth of the serving cell. A frequency position of the bandwidth may be shifted. Also, a bandwidth of an OFDM subcarrier may be changed. It may be defined as a partial set of the entire frequency bandwidth of the service, which may be referred to as a BWP that is a bandwidth part. However, it is provided as an example only and may apply alike if a bandwidth of a partial set is used.

Figure 2:
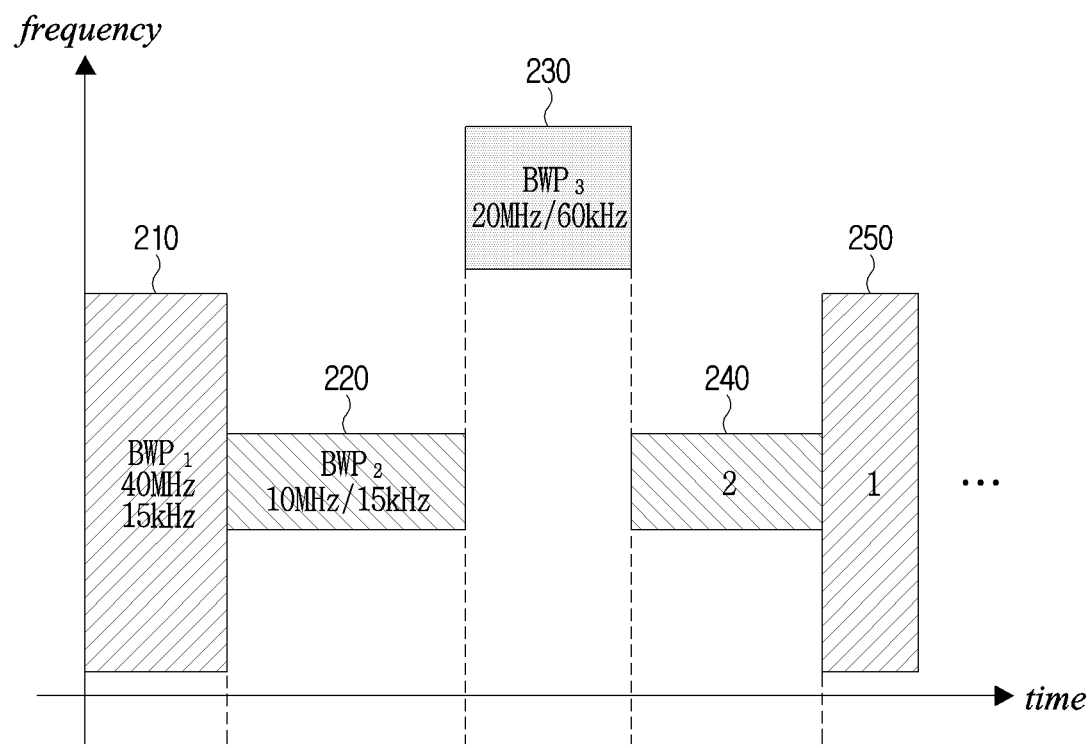
FIG. 2 illustrates a bandwidth part (WP) configuration according to the present disclosure.

In detail, FIG. 2 illustrates a method of configuring a BWP. For example, referring to FIG. 2, a serving cell may include one or more BWPs 210, 220, 230, 240, and 250. Here, in the case of a BWP of the serving cell, information about a plurality of different BWPs may be configured in a UE by way of a base station. Each of an uplink BWP and a downlink BWP may be configured. BWP configuration information may include information about an uplink and a downlink. Also, for example, a number of BWPs activated among the aforementioned plurality of BWPs may be limited to a single BWP. Here, if the UE is capable of activating at least one BWP, the base station may verify information about a maximum number of active BWPs and may simultaneously activate a plurality of BWPs based on the verified information. Also, for example, if the UE is configured with the serving cell, a single BWP may be activated for the serving cell even without separate signaling from the base station. Here, the UE may perform initial access to the serving cell and may use the activated BWP for the initial access. Also, the UE may use the initial BWP until the UE receives UE configuration information from the base station.

Also, when the UE receives the UE configuration from the base station, the UE may be configured with a default BWP. Here, the default BWP may be configured as a relatively narrow bandwidth. If an amount of data to be transmitted and received is small, the UE may reduce battery consumption of the UE by activating the default BWP. Also, for example, unless the UE is configured with the default BWP, the UE may use the initial BWP for the same purpose. However, it is provided as an example only.

Also, for example, an activated BWP of the serving cell may be changed with another BWP depending on circumstances. This operation may be defined as BWP switching. When performing BWP switching, the UE may inactivate a current active BWP and may activate a new BWP. Here, the aforementioned BWP switching operation may be performed when the UE receives BWP switching order through Physical Downlink Control Channel (PDCCH) order from the base station. Also, for example, the aforementioned BWP switching operation may be performed through an RRC configuration. Also, for example, the aforementioned BWP switching operation may be performed through a predetermined timer "bwp-InactivityTimer" as a timer for BWP inactivity. Also, for example, the aforementioned BWP switching operation may be performed in response to starting a random access. In the following, a case in which the aforementioned BWP switching occurs is described.

The base station may change an active BWP in the serving cell of the UE depending on circumstances. If the UE desires to change an active BWP, the base station may notify a BWP to be switched through a PDCCH. Here, the UE may perform the BWP switching operation through BWP switching related information included in the PDCCH.

Also, for example, the UE may perform the BWP switching operation through BWP switching related information included in an RRC message.

Also, for example, the aforementioned timer "BWPInactivityTimer" may be configured for each serving cell. Here, "BWPInactivityTimer" may be a timer for inactivating an active BWP, without being limited to the aforementioned name. That is, a timer performing the same functionality may be "BWPInactivityTimer." In the following, although "BWPInactivityTimer" is used for clarity of description, it is provided as an example only.

Here, if the aforementioned timer expires, the UE may inactivate a current active BWP and may activate the default BWP. That is, switching may be performed using the default BWP. Also, for example, based on the aforementioned description, if the UE is not configured with the default BWP, the UE may switch to the initial BWP. Here, the UE may reduce battery consumption by monitoring a narrow bandwidth through the aforementioned switching operation. Also, a start and restart condition of the timer may be represented by the following Table 2. That is, if the UE needs to maintain an active BWP as follows, the timer may start or restart to prevent the active BWP from being inactivated.

TABLE 2

Downlink assignment or uplink grant reception based on PDCCH
If a UE receives a downlink assignment or an uplink grant through PDCCH order, it represents that data to be transmitted and received is present and thus, a timer to maintain a current active BWP may start/restart.
MAC PDU transmission or reception
If a UE transmits a MAC PDU in a configured uplink grant or receives a MAC PDU in a configured downlink assignment, MAC PDU transmission and reception may be performed without receiving separate PDCCH order in the configured uplink grant and the configured downlink assignment. Therefore, the aforementioned operation also indicates that data to be transmitted and received is present and thus, a timer to maintain a current active BWP may start/restart.
In the case of performing BWP switching
In the case of performing BWP switching, a timer may start/restart in a new switched BWP.

Also, for example, referring to FIG. 2, at least one of a size of a frequency bandwidth used in a frequency domain, a subcarrier spacing length, and a length of time occupied in a time domain may be differently configured in a BWP. For example, in FIG. 2, a size of a frequency bandwidth, a subcarrier spacing length, and an occupancy time length of each of the BWPs 210, 220, 230, 240, and 250 may be differently configured based on BWP configuration information. However, it is provided as an example only.

Also, a random access resource may be configured for each BWP of a serving cell. That is, a configuration of a random access resource may be different for each BWP. Therefore, if the UE desires to perform random access, a case in which a random access resource is not configured in a current active BWP may be considered. Here, for example, the UE may autonomously switch to an initial BWP and start the random access without order from the base station. In detail, as described above, since the initial BWP may be configured for the initial access, the random access resource may be configured in the initial BWP at all times. Therefore, if the UE verifies that there is no random access resource in an active BWP, the UE may switch to the initial BWP and may perform a random access procedure without separate signaling.

As described above, an NR system may support a service that requires low latency and high reliability, such as URLLC, through supporting of various numerologies. Here, for example, a use case about high requirements may be considered as a current low latency and high reliability service. For example, at least one use case among entertainment industry using augmented reality (AR) or virtual reality (VR), factory automation, transportation industry, and power distribution may be considered. Here, the aforementioned use case may further improve requirements about low latency and high reliability in providing a service. Therefore, in the NR system operations of a UE and a base station that aim further enhanced URLLC may need to be defined. For example, the aforementioned definition may be referred to as NR Industrial Internet of Things (IMT). However, it is provided as an example only. For clarity of description, definition to meet the further enhanced requirements in the NR system is hereinafter referred to as IIoT.

The IIoT may support frequency range 1 and frequency range 2 based on the existing NR system. Also, the IIoT meets the requirements about URLLC that may use both TDD and FDD based on the existing NR system. For example, the IIoT may require a design to meet high reliability requirements of a data duplication and multi-connectivity enhancements service. For example, in the case of PDCP duplication, enhancements may be considered to generate a maximum of four copies. Here, if a number of copies increases, a resource use may increase. Therefore, enhancements of a PDCP duplication method may be considered to efficiently use resources. For example, a PDCP duplication may be selectively performed for each packet, not based on a radio bearer (RB). Also, for example, a PDCP duplication activity/inactivity method may be considered as enhancements. However, it is provided as an example only.

Also, for example, UL/DL intra-UE prioritization/multiplexing may be considered. In detail, if DL/UL radio resources collide between control and/or data traffic related to different QoS requirements, the UE may solve the aforementioned radio resource collision through an intra-UE prioritization and multiplexing method. For example, the radio resource collision may occur when designating priority for a downlink in the UE. In detail, the downlink in the UE may be prioritized. The UE may correspond to different DL assignments that are sequentially received. Radio resources for DL assignments may temporally overlap. Here, the UE may receive DL traffic through prioritization between DL assignments. As another example, a case of prioritizing an uplink in the UE may be considered. Here, a collision between a configured grant and a dynamic allocated grant may occur. A dynamic allocated grant received by the UE for uplink transmission may overlap on a time with a configured grant for type 1 or type 2.

Here, the dynamic allocated grant of the exiting UE may have higher priority than that of the configured grant at all times. Here, the NR IIoT may need to meet the requirements by focusing on URLLC traffic and thus, may need to operate in a different manner from an existing operation. Therefore, if a collision occurs between the configured grant and the dynamic allocated grant, the UE may perform UL traffic transmission using a single grant through prioritization. Also, for example, a case of prioritizing an uplink in the UE may be considered. Here, a collision may occur between configured grants. For example, in IIoT, configured grants for different services and/or traffic types may be configured in given BWPs of the serving cell. For example, a configured grant may be configured for improvement in stability and decrease in a waiting time in the IIoT. Herein, in the case of the existing UE, a single configured grant may be configured in a given BWP. Therefore, if a plurality of configured grants is configured in the BWP, the plurality of configured grants may overlap on a time axis.

In detail, the UE may simultaneously support services and/or traffic types for different requirements. Here, a configured grant may be configured for each service and/or traffic type. Therefore, a collision may occur between a plurality of configured grants according to the respective services and/or traffic types.

As another example, the UE may configure a plurality of configured grants to support a plurality of periodic TSN flows. Here, a period and an offset may differ for each flow. Therefore, the UE may configure a configured grant for each TSN flow. As described above, a collision may occur between the configured grants.

As another example, a plurality of configured grants may be configured to support a single service such as TSN. Here, in the TSN, a period of a data packet may differ according to an application. Also, in the TSN, the period of the data packet may not be a multiple of a slot or a symbol period. As described above, the plurality of configured grants may need to be configured. Also, if the plurality of configured grants is configured, a collision may occur between the configured grants. As another example, if an uplink in the UE is prioritized, a collision may occur between dynamic allocated grants. In detail, the UE may sequentially receive, from the base station, a plurality of dynamic approvals for uplink transmission using temporally overlapping Physical Uplink Shared Channel (PUSCH) resources. Here, in view of the aforementioned circumstance, the UE may need to process priority between a plurality of grants. For example, a case in which a collision occurs between control information and control information may be considered as a case in which an uplink in the UE is prioritized. Here, the UE may simultaneously trigger transmission of control information (e.g., SR, HARQ feedback, CSI) about traffic having high priority and transmission of control information about traffic having low priority. Here, the UE may need to process the priority between a plurality of grants.

Also, for example, a case in which an uplink in the UE is prioritized and a grant collision occurs between control information and data may be considered. For example, the UE may simultaneously trigger transmission of control information (e.g., SR, HARQ feedback, CSI) about traffic having high priority and data transmission about traffic having low priority. Here, the UE may need to process the priority between a plurality of grants.

Also, for example, enhancements to meet requirements may be required into consideration of TSN related enhancements. For example, the TSN may refer to technology that provides a low latency and low packet loss service based on Ethernet of Layer 2 (L2). Here, the TSN may represent technology that may reduce latency occurring between the UE and the base station by synchronizing time between components sharing network resources and by processing traffic based on the synchronized time.

For example, TSN enhancements may be required in the IIoT to support a use case such as motion control. Here, the motion control may target reliability of 99.9999% or more and may target clock synchronization of within 1 microsecond, and latency of within 0.5 ms. However, it is provided as an example only and the present disclosure is not limited to the aforementioned example. Therefore, to meet the requirements, a method of forwarding accurate reference timing may be required in the NR IIoT. Also, to meet the requirements, the NR IIoT may require QoS/scheduling enhancement for meeting low latency and high reliability requirements. Also, the NR IIoT may use Ethernet header compression technology for reducing overhead in a packet transmission. However, it is provided as an example only.

Hereinafter, an operation in a case in which a collision occurs between configured grants is described based on the aforementioned description.

Here, as described above, in the IIoT, a configured grant may be configured in the UE as a transmission grant to support a URLLC service. Here, the configured grant may indicate that a base station configures in advance a transmission grant to be used by a UE in the UE. In detail, to meet service requirements that request low latency and high reliability, the base station may preconfigure a configured grant in the UE. If data to be transmitted is present, the UE may perform data transmission through the configured grant without requesting the base station for an uplink grant. Here, two types of configured grants may be present in the NR. For example, type 1 (configured grant type 1) may be configured through an RRC reconfiguration message. Here, type 1 may be configured for each BWP of each carrier. For example, a configured grant based on type 1 may be valid as a configured grant although the UE does not currently use a BWP of a carrier in which the configured grant type 1 currently configured. Therefore, if the UE selects a BWP configured based on type 1 as the configured grant, the UE may perform data transmission by immediately using the grant without performing an additional operation. That is, the UE may meet low latency requirements of a service by transmitting data immediately using the configured grant at the very moment of selecting the BWP of the carrier in which the configured grant type 1 is configured.

As another example, the configured grant type 1 may be configured for the purpose of URLLC data transmission. For example, configured grant type 1 of the UE may be configured for each logical channel. That is, the UE may transmit data using the configured grant only for a logical channel capable of using the configured grant type 1. That is, as described above, whether the configured grant type 1 is available may be set to the logical channel.

As another example, the configured grant type 1 may be shared with another UE. As described above, the UE may repeatedly transmit the same data several times to increase a transmission probability even at an occurrence of a collision. Also, for example, if the UE transmits data using the configured grant type 1, the UE may operate based on configuredgrantTimer. For example, the UE may wait for Hybrid Automatic Repeat and Request (HARQ) feedback during operation of a timer. Here, if the timer expires, the UE may discard data stored in an HARQ buffer and may transmit another data. That is, the timer may operate based on an HARQ process.

On the contrary, type 2 (configured grant type 2) may be a configured grant that is dynamically configured through a PDCCH. For example, type 2 may be valid only in a BWP of a carrier currently being used. That is, as described above, the UE may transmit data without causing latency for a transmission grant selection process based on the configured grants of type 1 and type 2.

Also, for example, the configured grant type 2 may be configured for the purpose of periodic data transmission. Here, the UE may transmit data using the configured grant type 2 and may activate or inactivate by the PDCCH.

Here, since the NR IIoT requires low latency and high reliability, all of configured grants of type 1 and type 2 may be used in view of the aforementioned requirements. Also, for example, to support different services and/or a single service, a plurality of configured grants may be configured in a single BWP. It is further described below.

Here, for example, as described above, the NR IIoT may support a plurality of configured grants to meet strict requirements of the URLLC service. Here, if the plurality of configured grants is configured, a collision may occur between the configured grants. Here, if the collision occurs between the configured grants, the UE may select a specific configured grant from among the colliding configured grants. Also, a network configuration may be defined based on the collision between the configured grants. In the following, a method of performing transmission by selecting a most appropriate configured grant if a collision occurs between configured grants is described. Also, a method of guaranteeing transmission for the UE to retransmit dropped data due to a collision between configured grants is described. Here, the following configuration may expandable apply to not only the aforementioned circumstance but also similar fields as a case of a grant collision, without being limited to the aforementioned example.

As described above, if a collision occurs between configured grants, the UE may select a specific grant from among the colliding configured grants and may perform transmission.

For example, the UE may perform transmission through a plurality of configured grants to support different URLLC services and/or traffic types. As another example, to support a single service such as the aforementioned TSN, the UE may perform transmission using the plurality of configured grants. Here, for example, in the TSN, a period of a data packet may differ according to an application. Also, in the TSN, a transmission period of the data packet may not be a multiple of a slot or a symbol period. For example, the data packet may be generated based on an application layer and thus, may not be a multiple of the slot or symbol period. However, it is provided as an example only. Here, the UE may need to perform data transmission through the plurality of configured grants. For example, since the transmission period of the data packet is not a multiple of the slot or symbol period for the same service, the UE may configure the plurality of configured grants and may perform transmission.

Here, for example, in addition to the aforementioned cases, a plurality of configured grants may be configured in the UE. That is, the following description may relate to a UE operation and a network configuration for a case in which the plurality of configured grants is configured in the UE and the plurality of configured grants collides and is not limited to a method of configurating the plurality of configured grants.

The base station may configure a configured grant in the UE. In detail, the base station may configure a plurality of type 1 (configured grant type 1) grants in the UE through an RRC message (or RRC reconfiguration message). Also, for example, as described above, the base station may configure a plurality of type 2 (configured grant type 2) grants in the UE through a PDCCH. Also, for example, the base station may configure all of type 1 and type 2 in the UE through the RRC message (or RRC reconfiguration message). However, it is provided as an example only.

Here, if the base station configures type 1 and/or type 2 grants in the UE, the base station may configure a UE ID, CS-RNTI, used for HARQ retransmission in the UE. Here, for example, the base station may configure parameters of the following Table 3 for each configured grant. For example, the parameters of the following Table 3 may include at least one of "periodicity" that is period information, "timeDomainOffset" that is time domain offset information, "timeDomainAllocation" that is time domain allocation information, and "nrofHARQ-Processes" that is information about a number of HARQ processes. In detail, "periodicity" may represent a period of a configured grant. Here, for example, as described above, a period may be indicated for each configured grant. Also, "timeDomainOffset" may represent a resource offset about "SFN (System Frame Number)=0." Also, "timeDomainAllocation" may be resource allocation information configured in a time domain. For example, "timeDomainAllocation" may include "startSymbolAndLength." Also, "nrofHARQ-Processes" may represent a number of HARQ processes for a configured grant. Also, for example, the base station may configure information aside from information of the following Table 3 in the UE. However, it is provided as an example only.

TABLE 3 periodicity
timeDomainOffet
timeDomainAllocation
nrofHARQ-Processes

Here, for example, the base station may not configure "timeDomainOffset" and "timeDomainAllocation" for type 2. Also, for example, the CS-RNTI may be used for retransmission with respect to type 2. Also, the CS-RNTI may be used to indicate activity or inactivity of a grant for type 2. Also, for example, the base station may allocate a grant such that a different HARQ process may be used for each configured grant.

Here, if the configured grant type 1 is configured in the UE, an $N^{th}$ configured grant may be configured in the UE according to the following Equation 1. For example, if the configured grant type 1 is configured in the UE, the UE may verify a symbol in which the $N^{th}$ configured grant is configured. Here, for example, in the following Equation 1, S denotes a start symbol of a slot. Also, "periodicity" may be the aforementioned parameter. That is, the UE may verify a grant for type 1 among configured grants configured by the base station through the following Equation 1. However, it is provided as an example only.

[(SFN×numberOfSlotPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity)modulo(1024×numberOfSlotsPerFrame×numberOfSymbolsPerSlot), for all N>=0    [Equation 1]

As another example, if the configured grant type 2 is configured in the UE, the UE may verify a symbol in which a configured grant is configured according to the following equation 2. That is, the UE may verify a grant for type 2 among configured grants configured through the base station according to the following Equation 2. However, it is provided as an example only.

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N× periodicity] modulo (1024× numberOfSlotsPerFrame× numberOfSymbolsPerSlot), for all N>=0    [Equation 2]

As another example, if the UE uses a configured grant, the UE may perform an HARQ process. Here, an HARQ process ID related to a case in which the UE uses the configured grant may be induced according to the following Equation 3. Here, for example, "periodicity" and "nrofHARQ-processes" may be verified through the aforementioned parameters. However it is provided as an example only.

HARQ ProcesID=[floor(CURRENT_symbol/periodicity)] modulo nrof HARQ-Processe    [Equation 3]

Also, for example, in Equation 3, CURRENT_symbol/periodicity may be induced according to the following Equation 4.

CURRENT$_{symbol}$=(SFN×numberOfSlotsPerFrame× numberOfSymbolsPerSlot+slot number in the frame×numberOfSymbolsPerSlot+symbol number in the slot)    [Equation 4]

Here, "numberOfSlotsPerFrame" and "numberOfSymbolsPerSlot" may represent a number of consecutive slots per frame and a number of consecutive symbols per slot, respectively. However, it is provided as an example only.

Here, according to the aforementioned operation, a plurality of configured grants may be configured in the UE. For example, as described above, a plurality of configured grants may be configured in the UE. Here, if a collision occurs between the plurality of configured grants configured in the UE, the UE may select a specific grant from among the plurality of configured grants.

Figure 3:
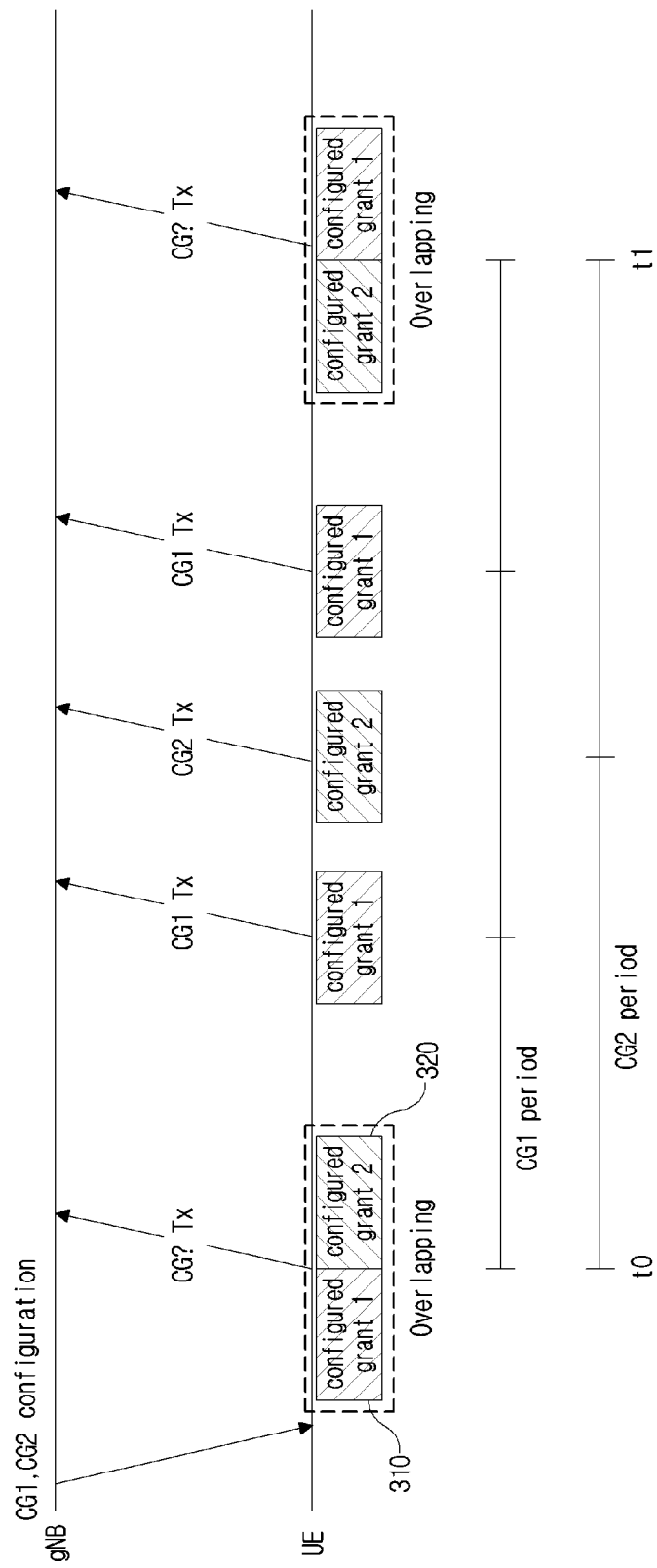
FIG. 3 illustrates a scenario in which a collision occurs between a plurality of configured grants according to the present disclosure.

In detail, referring to FIG. 3, configured grant 1 (Configuration Grant 1, CG1) and configured grant 2 (Configuration Grant 2, CG2) may be configured in the UE. However, it is provided as an example only and is not limited to the aforementioned example.

Each configured grant configured in the UE may be transmitted at a different period.

Here, although each configured grant has a different period, PUSCH transmission intervals about the respective configured grants may partially overlap. For example, referring to FIG. 3, PUSCH transmissions about CG1 and CG2 configured in the UE may overlap at t0. That is, a grant 310 for CG1 and a grant 320 for CG2 may overlap at a time t0. Here, the UE needs to select a single grant from among the grant 310 for CG1 and the grant 320 for CG2. That is, if a plurality of configured grants is configured in the UE, the UE may select a single configured grant from among the plurality of configured grants and may perform transmission based on the selected configured grant.

Here, for example, the plurality of configured grants configured in the UE may be prioritized. For example, if a collision occurs between the plurality of configured grants, the UE may select a configured grant having high priority from among the plurality of configured grants and may perform transmission.

As another example, if a collision occurs between the plurality of configured grants, the UE may select a temporally preceding configured grant from among the plurality of configured grants. That is, the UE may select the temporally preceding configured grant regardless of the priority and may perform transmission.

As another example, if a collision occurs between the configured grants, the UE may verify whether it relates to the same service. However, it is provided as an example only. For example, the plurality of configured grants may be configured in the UE to support different services. Here, the collision may occur between the plurality of configured grants for supporting different services. Here, the UE may select a configured grant for a service having high priority based on the priority of each service.

As another example, the plurality of configured grants may be configured to support a single service. Here, a collision may occur between the plurality of configured grants configured in the UE. Here, the UE may select a temporally preceding configured grant. That is, in the case of selecting a single configured grant, the UE needs to determine whether the configured grants relate to the same service or different services. Here, if the plurality of configured grants is configured in the UE for the same service, the UE may select a temporally preceding configured grant. Also, for example, if the plurality of configured grants is configured in the UE for different services, the UE may select a configured grant having high priority from among the configured grants.

Figure 4:
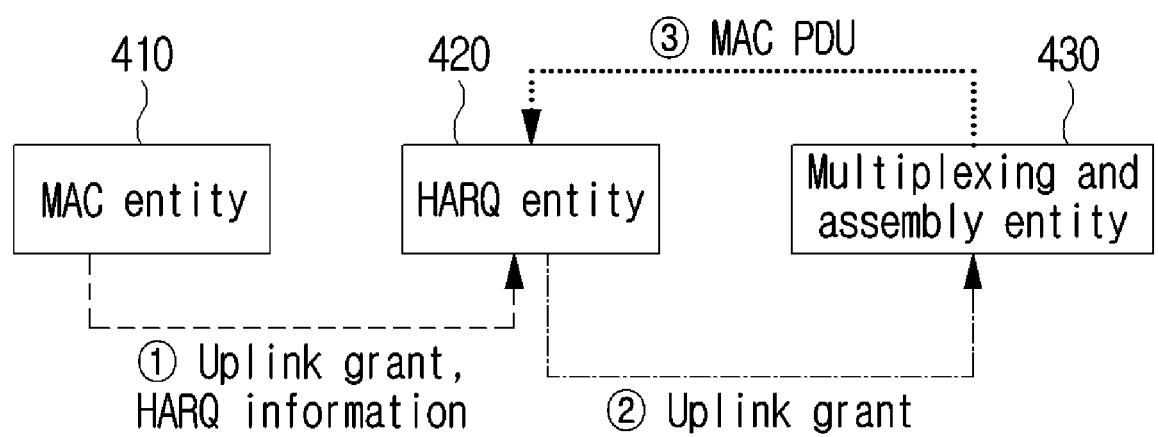
FIG. 4 illustrates an uplink transmission operation of a user equipment (UE) according to the present disclosure.

The UE may need to internally exchange information about occurrence or non-occurrence of a collision between configured grants and/or information about priority for the aforementioned operation. In detail, a MAC entity of the UE may include an entity (e.g., an HARQ entity and a multiplexing and assembly entity) in charge of each role and may perform a function (e.g., uplink grant reception, LCP, MAC PDU configuration). Here, for example, referring to FIG. 4, a MAC entity 410 of the UE may verify a received grant through an uplink grant reception function. Here, the MAC entity 410 of the UE may identify HARQ information and an HARQ process ID of the corresponding grant. Next, the MAC entity 410 of the UE may forward information about an uplink grant and HARQ information to an HARQ entity 420 of the UE. Here, the HARQ entity 420 of the UE may forward information for acquiring a MAC PDU to a multiplexing and assembly entity 430 of the UE with respect to the corresponding HARQ process ID through the received information. Here, the multiplexing and assembly entity 430 of the UE may perform LCP for performing a data transmission through the aforementioned grant. Here, the LCP may indicate selecting a logical channel to transmit data using the grant. Also, the multiplexing and assembly entity 430 of the UE may configure the MAC PDU by performing multiplexing of data (MAC SDU) received from the selected logical channel. Here, the HARQ entity 420 of the UE may store the MAC PDU in a corresponding process ID based on HARQ information and the HARQ process ID of the received grant. Next, the UE may perform data transmission based on the HARQ information. That is, each entity of the UE may perform each corresponding functionality for the data transmission. Here, for example, each entity of the UE may be unaware of information of another entity. Therefore, information required for processing may need to be exchanged between the respective entities. For example, an uplink grant reception entity may verify available grant information. Here, the uplink grant reception entity may be unaware of a logical channel of which data is to be transmitted through the corresponding grant. Also, for example, the LCP may select a logical channel to be transmitted through the corresponding grant, but may be unaware of information about whether a collision occurs between grants and a subsequent available transmission time.

Here, if a collision occurs between the plurality of configured grants configured in the UE, a service for each grant and prioritization for the service may be performed through an LCP process. Here, whether the collision occurs between the plurality of configured grants may be verified through an uplink grant reception function of the UE. Considering this, the UE needs to internally exchange information. In detail, the UE may verify whether the collision occurs between the plurality of configured grants through the uplink grant reception function. Here, the UE may not verify a logical channel of which data is transmitted in the corresponding grant. That is, the UE may be unaware of a service to which logical channel data of the corresponding grant corresponds. Therefore, the UE may not compare priority between the configured grants and may not verify which configured grant the UE needs to select.

Therefore, the UE may need to provide information about occurrence of the collision such that the LCP may select a single configured grant through service and priority comparison. Also, the LCP needs to provide priority information such that the HARQ entity may transmit a MAC PDU having higher priority, which is described below.

Here, for example, referring to FIG. 5, a UE may perform uplink data transmission. In detail, referring to FIG. 5(a), the UE may induce an HARQ process ID associated with a PUSCH transmission interval about each activated configured grant based on the aforementioned Equation 3 and Equation 4. Here, for example, if "configuredgrantTimer" is not in an operating state for a corresponding HARQ process, the UE may determine that a new data indicator (NDI) is toggled for the corresponding HARQ process. Here, a MAC entity 510 of the UE may forward a configured grant and related HARQ information to an HARQ entity 520 to transmit new data. Here, the NDI may be a parameter value used to indicate whether a packet is initial transmission or retransmission of the corresponding HARQ process. Here, if the NDI is toggled, the UE may perform the initial transmission. On the contrary, unless the NDI is toggled, the UE may perform the retransmission. Here, for example, if "configuredgrantTimer" does not operate, the UE may not perform the retransmission anymore. Therefore, the UE may determine that the NDI is toggled and may perform new transmission.

Here, the HARQ entity 520 may identify an HARQ process about a corresponding grant through the configured grant and HARQ information received from the MAC entity 510. Here, the HARQ entity 520 may acquire a MAC PDU to be transmitted using the identified HARQ process from a multiplexing and assembly entity 530.

Here, for example, the multiplexing and assembly entity 530 may perform LCP. Next, the multiplexing and assembly entity 530 may configure a MAC PDU based on the LCP. For example, the LCP may be a process of selecting an appropriate logical channel based on a transmission grant allocated in an uplink grant and selecting an amount of data to be transmitted for each selected logical channel. Therefore, if the UE performs new transmission, the UE may select data to be transmitted based on each transmission grant by performing the LCP. Here, for example, to control scheduling of uplink data, the base station may provide the UE with a parameter about at least one of "priority," "prioritisedBitRate," and "bucketSizeDuration" for each logical channel. Here, the UE may perform a configuration for each logical channel based on the parameter received from the base station. Here, for example, "priority" may represent priority of each logical channel. For example, the higher a "priority" value, the lower priority. Also, "prioritisedBitRate (PBR)" may represent a prioritized bit rate. Also, "bucketSizeDuration" may represent a bucket size duration time. Also, for example, the base station may additionally configure a parameter about a mapping limit to each logical channel. Here, the aforementioned parameter may be at least one of "allowedSCS-List," "maxPUSCH-Duration," "configuredGrantType1Allowed," and "allowedServingCells." Here, "allowedSCS-List" may represent a subcarrier spacing in which transmission is allowed. Also, "maxPUSCH-Duration" may represent a maximum PUSCH duration time allowed for transmission. Also, "allowedServingCells" may represent a cell in which transmission is allowed. Also, subcarrier spacing information, PUSCH transmission duration information, and cell information may be included in each uplink grant. Therefore, the UE may select a logical channel that meets the aforementioned condition based on transmission information of the uplink grant. Meanwhile, for example, "configuredGrantType1Allowed" may represent whether data of a corresponding logical channel may be transmitted using configured grant type 1. That is, if the uplink grant is configured grant type 1, the UE may select only a logical channel in which "configuredGrantType1Allowed" is set to "true."

Here, for example, as described above, a plurality of configured grants may be configured in the UE and a collision may occur between the plurality of configured grants. Here, if the collision occurs between the configured grants, the MAC entity 510 may forward collision indication information to the HARQ entity 520. Next, the HARQ entity 520 may forward information about the uplink grant and collision indication information to the multiplexing and Assembly entity 530. That is, as described above, since each of entities in the UE is unaware of information about functions performed by other entities, information related thereto needs to be forwarded. Here, even the MAC entity 510 of the UE may forward corresponding information to notify the HARQ entity 520 of information about the collision. Also, the HARQ entity 520 may transmit corresponding information to the multiplexing and Assembly entity 530 that constitutes the MAC PDU.

Here, if the same logical channel is selected with respect to configured grants between which a collusion occurs, the UE may be aware that the corresponding collision relates to a collision between the configured grants for the same service. Here, for example, the UE may determine to select and use a temporally preceding grant from among the colliding configured grants. That is, as described above, if the plurality of configured grants is configured for the same service and the collision occurs between the configured grants, the UE may select and use the temporally preceding grant from among the colliding configured grants. Through this, the UE may prevent latency from occurring with respect to the same service. Meanwhile, for example, the UE may configure a MAC PDU for a temporally preceding configured grant such that data may be transmitted through the corresponding grant. On the contrary, the UE may not configure a MAC PDU for a configured grant that does not temporally precede.

As another example, referring to FIG. 5(b), if different logical channels are selected with respect to configured grants between which a collision occurs, the UE may verify that the corresponding collision relates to a collision between the configured grants for the different services. Here, the MAC entity 510 of the UE may forward collision indication information to the HARQ entity 520. Next, the HARQ entity 520 may forward information about the uplink grant and collision indication information to the multiplexing and Assembly entity 530. That is, as described above, since each of entities in the UE is unaware of information about functions performed by other entities, information related thereto needs to be forwarded. Here, even the MAC entity 510 of the UE may forward corresponding information to notify the HARQ entity 520 of information about the collision. Also, the HARQ entity 520 may transmit corresponding information to the multiplexing and Assembly entity 530 that configures the MAC PDU.

As described above, the UE may compare priority between logical channels for the respective grants through the LCP process. Here, the UE may select a logical channel having higher priority and a configured grant for the logical channel and may perform transmission. That is, the UE may configure a MAC PDU based on a logical channel having higher priority and a configured grant thereof.

For example, even using a logical channel having low priority and a configured grant thereof, the UE may configure a MAC PDU. Here, in the case of configuring the MAC PDU for each configured grant, the multiplexing and assembly entity 530 of the UE may provide priority information about the MAC PDU to the HARQ entity 520 of the UE. Here, the HARQ entity 520 may receive the aforementioned priority information and the MAC PDU and may store the same in an HARQ buffer. Here, the HARQ entity 520 may perform transmission for the MAC PDU having higher priority.

Also, for example, if different logical channels are selected grants between which a collision occurs, the UE may determine to select and use a temporally preceding grant from among the colliding configured grants. That is, as described above, if a plurality of configured grants is configured with respect to different services and a collision occurs between the configured grants, the UE may select and use the temporally preceding grant from among the colliding configured grants. Therefore, the UE may select and use a temporally preceding grant for a different service. However, it is provided as an example only. Meanwhile, for example, the UE may configure a MAC PDU for a temporally preceding configured grant such that data may be transmitted through the corresponding grant. On the contrary, the UE may not configure a MAC PDU for a configured grant that does not temporally precede. That is, if the collision occurs between the configured grants, the UE may perform transmission for a temporally preceding grant regardless of whether the configured grants relate to the same service. However, it is provided as an example only.

Meanwhile, as described above, if the collision occurs between the configured grants, the UE may select a single grant and may perform transmission using the selected grant. Here, for example, if a collision occurs between configured grants that are configured for a single service, the base station may expect to select and use a single transmission grant. Here, for example, if a plurality of configured grants is configured to support different services, all of the plurality of configured grants may target an URLLC service. That is, as described above, as a case in which the plurality of configured grants is configured to secure low latency and high reliability, if a collision occurs, the UE may need to guarantee data transmission for a dropped configured grant based on priority. For example, the base station may allocate a retransmission grant to CS-RNTI of the UE to guarantee transmission of data of which transmission is omitted. It is further described below.

Figure 6:
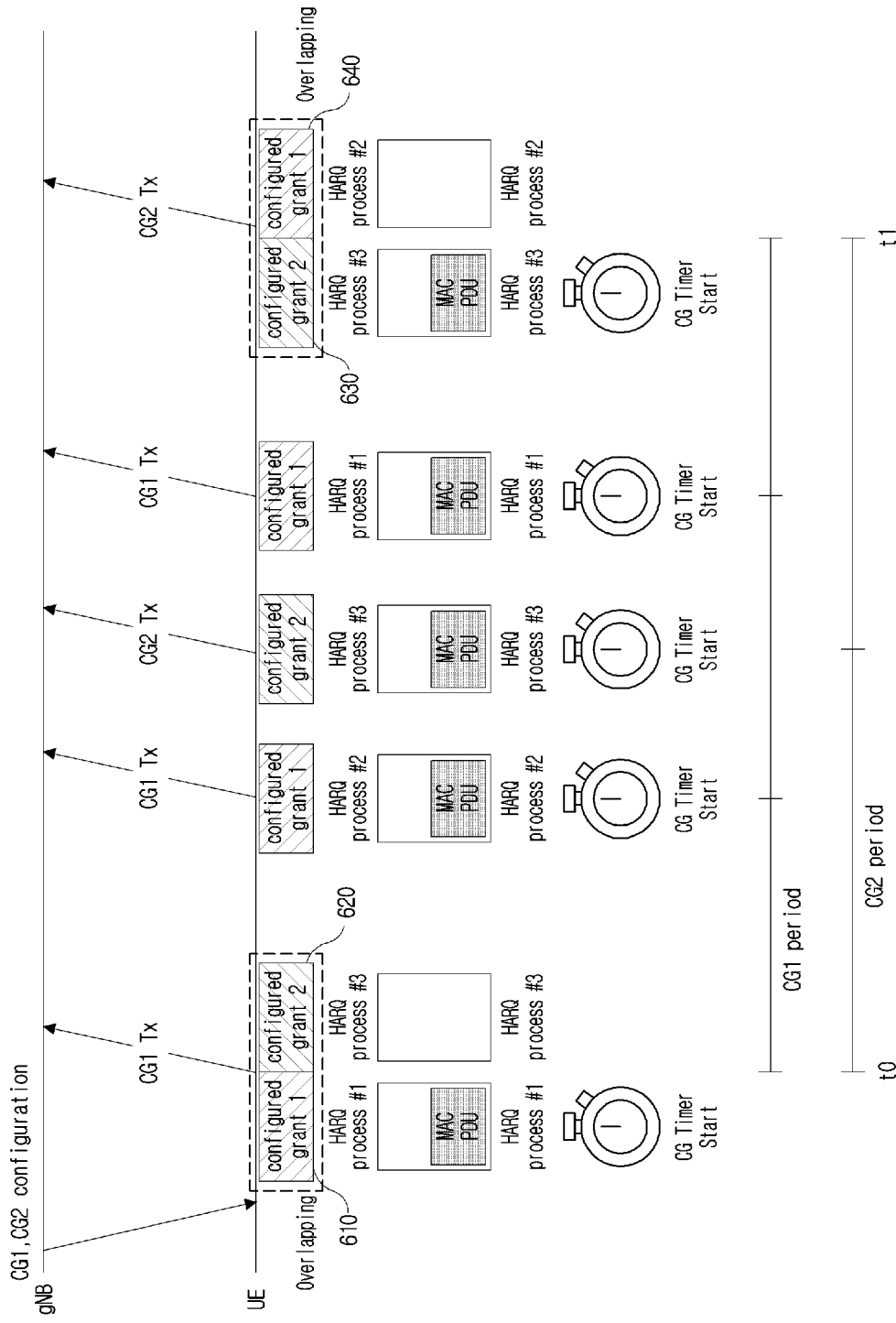
FIG. 6 illustrates an operation of a UE according to the present disclosure.

FIG. 6 illustrates an operation of a UE according to the present disclosure. Referring to FIG. 6, a plurality of configured grants may be configured in the UE. Here, the configured grants may be configured based on different periods. For example, if a collision occurs between the plurality of configured grants, the UE may select a temporally preceding grant from among the configured grants and may perform transmission. Here, the UE may configure a MAC PDU for the temporally preceding grant and may not configure a MAC PDU for a sub sequent grant in which the collision occurs. That is, referring to FIG. 6, a grant 610 for configured grant 1 (CG1) and a grant 620 for configured grant 2 (CG2) may collide at a time t0. That is, a first collision may occur between the plurality of configured grants configured in the UE at the time t0. Here, the UE may configure a MAC PDU for the temporally preceding CG1 and may store the same in a corresponding HARQ process and may not configure a MAC PDU for CG2 in which the collusion occurs. Also, for example, a grant 630 for CG1 and a rant 640 for CG2 may collide at a time t1. That is, a second collision may occur between the plurality of configured grants configured in the UE at the time t1. Here, the UE may configure a MAC PDU for the temporally preceding CG2 and may store the same in a corresponding HARQ process and may not configure a MAC PDU for CG1 in which the collusion occurs. That is, the UE may configure a MAC PDU for a temporally preceding configured grant and may not configure a MAC PDU for a configured grant that does not temporally precede at each collision point in time. Here, for example, the aforementioned description may apply to a case in which a plurality of configured grants is configured for the same service. For example, as described above, the reason why the plurality of configured grants is configured for the same service may be to support a period of a data packet that is not transmitted at a multiple of a symbol and/or slot period in TSN. As described above, if configured grants are configured for the same service, a base station may be aware of a point in time at which a collision occurs between the grants. Here, since the grants relate to the same service, the UE may select a temporally preceding single grant and perform transmission, which may lead to reducing latency of packet transmission. Therefore, the UE may configure a MAC PDU for the temporally preceding grant. For example, in the case of configuring a MAC PDU, the UE may select an appropriate logical channel based on transmission grant information through an LCP process. Here, a transmission grant corresponding to a PBR value set to a logical channel may be allocated to a corresponding logical channel starting from a logical channel having top priority based on the selected logical channel. Next, if a grant remains, the UE may allocate a grant to a corresponding logical channel based on priority of the selected logical channel until all of an uplink grant or data of the corresponding logical channel is consumed. The UE may configure a MAC SDU based on the allocated grant such that available data may be transmitted to each logical channel. Next, the UE may configure a single MAC PDU by multiplexing MAC SDUs configured from the respective logical channels. As described above, if the UE configures a MAC PDU, an HARQ entity of the UE may store the MAC PDU, an uplink grant, and HARQ information in a corresponding HARQ process. Next, an HARQ entity of the UE may indicate the identified HARQ process to trigger new transmission. Here, if the aforementioned uplink grant is a configured grant and if the UE performs transmission for the HARQ process, "configuredgrantTimer" may start or restart. The UE may expect to perform retransmission for the MAC PDU stored in the corresponding HARQ during the operation of "configuredgrantTimer." On the contrary, the HARQ entity may determine that there is no data to be transmitted for a grant for which a MAC PDU is not acquired and may not perform transmission. That is, in FIG. 6, the UE may select the temporally preceding CG1 at the first collision out of two collisions. On the contrary, at the second collision, the UE may select the temporally preceding CG2 and may perform transmission. However, it is provided as an example only.

Also, for example, although description is made based on a case in which the plurality of configured grants is configured for the same service, the plurality of configured grants may be configured for different services. In this case, the UE may perform transmission through a temporally preceding configured grant. However, it is provided as an example only.

Figure 7:
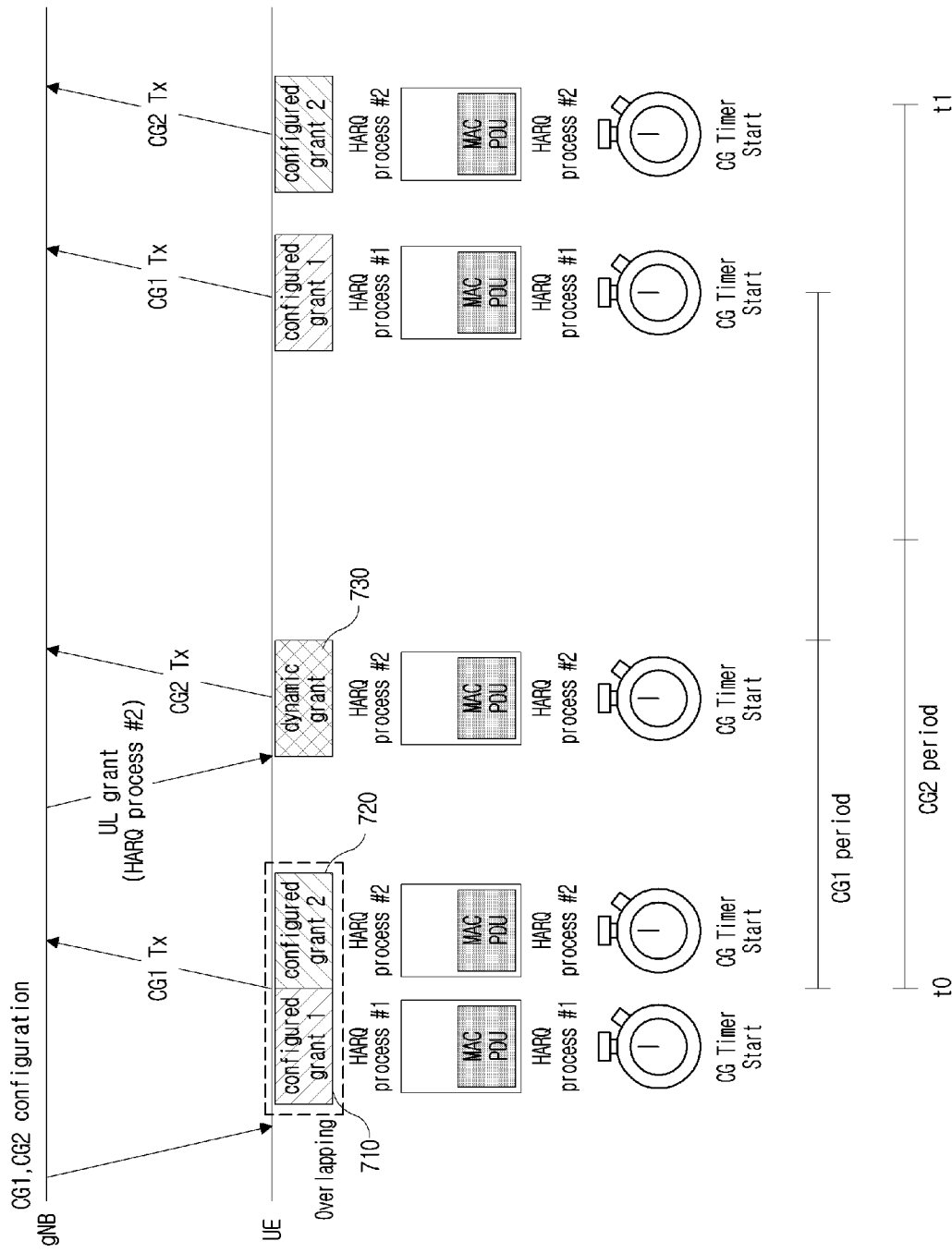
FIG. 7 illustrates an operation of a UE according to the present disclosure.

Also, FIG. 7 illustrates an operation of a UE according to the present disclosure. For example, referring to FIG. 7, a plurality of configured grants may be configured in the UE. Here, a collision may occur between the plurality of configured grants configured in the UE. Here, the UE may determine priority for the plurality of configured grants based on the aforementioned description. That is, a specific configured grant may have high priority among the plurality of configured grants. Here, as described above, the UE may configure a MAC PDU for the configured grant having high priority and may perform transmission. Meanwhile, for example, as described above, the UE may configure a MAC PDU for the configured grant of which transmission is omitted. For example, an HARQ entity of the UE may transmit a MAC PDU corresponding to high priority based on priority information provided through LCP. On the contrary, an HARQ entity of the UE may not transmit a MAC PDU corresponding to low priority. Here, even with respect to a MAC PDU of which transmission is omitted, the UE may expect to perform transmission using a retransmission grant addressed to CS-RNTI. For example, the UE may perform retransmission for a MAC PDU of which transmission is omitted through the aforementioned grant addressed to the CS-RNTI. Therefore, the UE may need to start "configuredgrantTimer" for the MAC PDU of which transmission is omitted. That is, although the UE does not perform transmission, the UE may expect to receive a retransmission grant by starting "configuredgrantTimer" in a transmission interval of the corresponding grant. In response to receiving the retransmission grant, the UE may immediately transmit the configured MAC PDU. In detail, as described above, if "configuredgrantTimer" is not in an operating state for a corresponding HARQ process, the UE may determine that an NDI for the corresponding HARQ process is toggled and may transmit new data. Alternatively, if "configuredgrantTimer" is not in the operating state for the corresponding HARQ process, the UE may ignore an uplink grant received using CS-RNTI. The UE may receive a grant for retransmission and perform the retransmission only while "configuredgrantTimer" operates. Therefore, if the aforementioned "configuredgrantTimer" does not operate, the UE may ignore the uplink grant received using the corresponding CS-RNTI and may not perform transmission. That is, if "configuredgrantTimer" is not in the operating state, the UE may not perform retransmission anymore. In view of the aforementioned aspect, the UE may start "configuredgrantTimer" to perform retransmission for a MAC PDU of which transmission is omitted. Here, if the UE receives a retransmission grant using CS-RNTI, the UE may immediately perform transmission without performing additional processing for configuring the MAC PDU, which may be advantageous in terms of decreasing latency. Here, for example, in association with the aforementioned operation, the plurality of configured grants may relate to different services. That is, for different services, the UE may need to perform retransmission for a corresponding service for URLLC, which differs from a case in which the plurality of configured grants relates to the same service. If the plurality of configured grants relates to different services in view of the aforementioned aspect, the UE may configure a MAC PDU and may start "configuredgrantTimer" although transmission is omitted.

Also, for example, since retransmission may be performed even for the same service, the UE may configure the MAC PDU and may start "configuredgrantTimer" although transmission is omitted, without being limited to the aforementioned example.

As another example, the UE may configure a MAC PDU only for a logical channel (LCH) and a grant having high priority. Here, for example, the HARQ entity may perform MAC PDU transmission only for an HARQ process for which a MAC PDU is acquired.

Here, for example, if a plurality of configured grants is configured to support different services, a dropped configured grant may also target a URLLC service. Therefore, the UE may need to guarantee transmission even for data that is not transmitted due to priority. Here, for example, to guarantee transmission of data of which transmission is omitted, the base station may allocate a transmission grant to C-RNTI of the UE. However, it is provided as an example only.

In detail, for example, referring to FIG. 7, a collision may occur between a grant 710 for configured grant 1 (CG1) and a grant 720 for configured grant 2 (CG2) at a time t0. Here, for example, priority of CG1 may be higher than that of CG2. Therefore, the UE may configure a MAC PDU for CG1 and may perform transmission at the time t0. Meanwhile, the UE may configure a MAC PDU for CG2. That is, the UE may configure the MAC PDU for CG2 of which transmission is omitted. Also, the UE may start "configuredgrantTimer" for the MAC PDU for CG2. Next, the UE may receive an allocation of a grant 730 for retransmission from a base station based on CS-RNTI. Here, the UE may perform the MAC PDU for CG2 through the grant 730 allocated for retransmission. However, it is provided as an example only.

Figure 8:
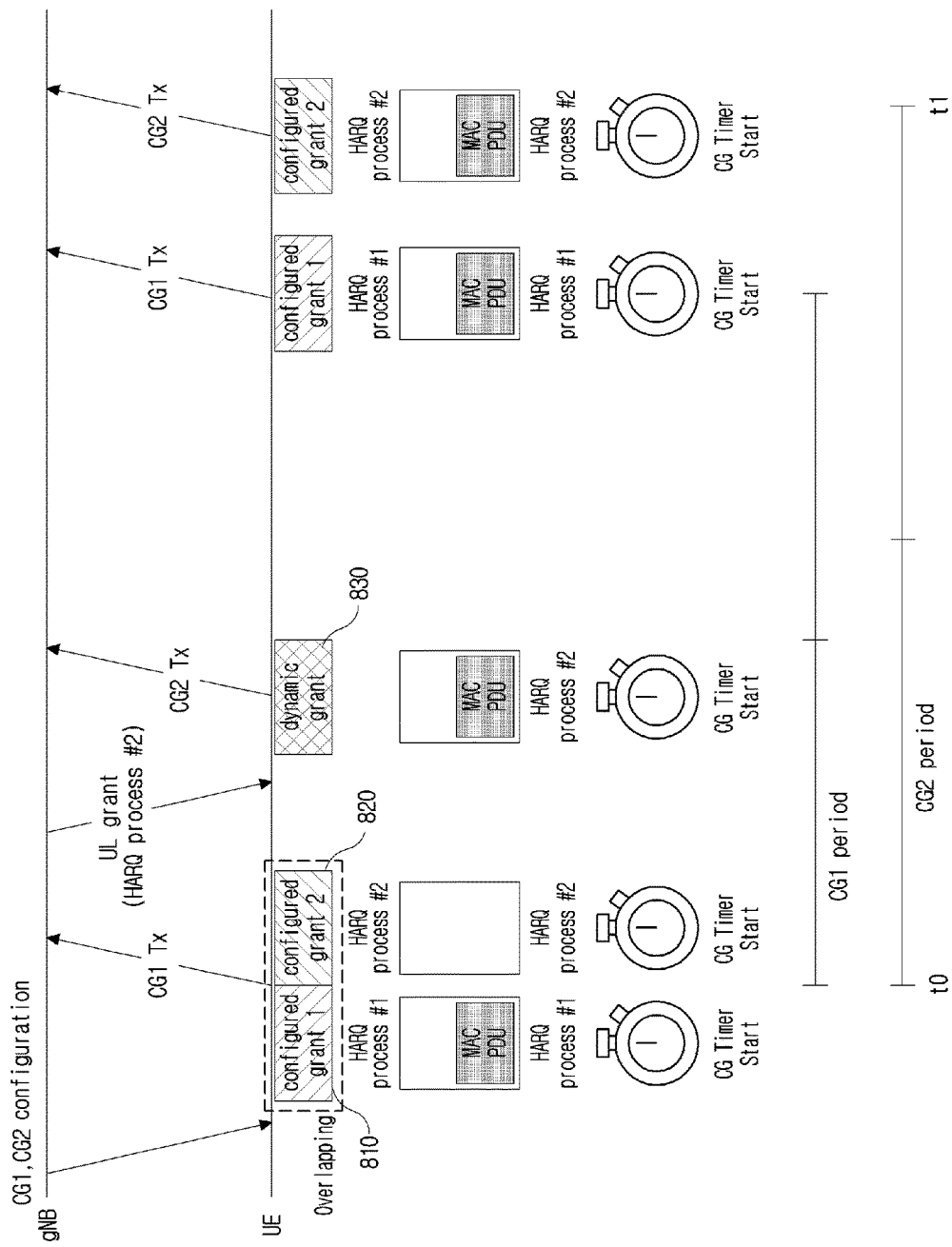
FIG. 8 illustrates an operation of a UE according to the present disclosure.

Also, for example, referring to FIG. 8, a plurality of configured grants may be configured in a UE. As describe above, the UE may verify a configured grant having high priority. Here, the UE may configure a MAC PDU only for the configured grant having high priority and may perform transmission. That is, the UE may not configure a MAC PDU for a grant of which transmission is omitted as a configured grant having low priority. Here, an HARQ entity may perform MAC PDU transmission only for an HARQ process for which a MAC PDU is acquired. Here, for example, the UE may transmit data of which transmission is omitted and thus is dropped using an uplink grant addressed to C-RNTI. In detail, the UE may expect to transmit data of which transmission is omitted and that is dropped using the uplink grant addressed to C-RNTI. Here, as described above, the UE may store the configured MAC PDU in the corresponding HARQ process through LCP and MAC PDU configuration process for the uplink grant addressed to C-RNTI and then may perform transmission. Therefore, dissimilar to the example of FIG. 7, in the case of performing retransmission for a grant of which transmission is omitted, the UE may perform an additional procedure and then perform transmission. Therefore, transmission may be delayed. Here, for example, the UE may require transmission of data that is additionally generated at a point in time at which the UE transmits data for a configured grant of which transmission is omitted. Therefore, dissimilar to the example of FIG. 7, the UE may not configure a MAC PDU for a configured grant of which transmission is omitted at a collision point in time. Next, as described above, the UE may store the configured MAC PDU in the corresponding HARQ process through the LCP and MAC PDU configuration process and then may perform transmission. However, it is provided as an example only.

As another example, if the UE performs transmission using a dynamic allocated uplink grant through a PDCCH, a parameter "configuredgrantAllowed" may not be applied. That is, if the UE performs retransmission for a grant of which transmission is omitted, the UE may transmit even other data in addition to URLLC data. That is, based on the aforementioned circumstance, if the UE performs retransmission for data of which transmission is omitted, additional limit may be configured in the UE to guarantee URLLC data transmission. For example, a case in which the UE receives an uplink grant addressed to C-RNTI may be considered as a case in which a collision occurs between configured grants. Here, if an HARQ process ID of the corresponding uplink grant is identical to an HARQ process ID of data of which transmission is omitted, the UE may configure a MAC PDU for data of which transmission is omitted and that is dropped as described above, and may preferentially transmit the dropped data. Here, for example, as described above, the base station may allocate an additional grant such that the UE may perform retransmission for a grant of which transmission is omitted and thereby guarantee URLLC data transmission. Accordingly, the UE may perform retransmission for a grant of which transmission is omitted through the grant allocated from the base station.

Meanwhile, for example, in association with the aforementioned operation, a case in which a collision occurs between configured grants may be applied as a case in which a plurality of configured grants for different services is configured in the UE. That is, for different services, there is a need to guarantee transmission for a grant of which transmission is omitted in view of URLLC data transmission. Accordingly, as described above, the UE may configure a MAC PDU for a grant of which transmission is omitted and may perform transmission. However, it is provided as an example only.

In detail, for example, referring to FIG. 8, the UE may perform transmission through configured grant 1 (CG1) and configured grant 2 (CG2). Here, if a collision occurs between a grant 810 for CG1 and a grant 820 for CG2, the UE may configure a MAC PDU for a configured grant having high priority and may perform transmission. For example, in FIG. 8, the UE may perform transmission by selecting the grant 810 for CG1 and by configuring the MAC PDU for the selected grant 810. Here, the UE may not select the grant 820 for CG2 having low priority and may not configure a MAC PDU for CG2. Next, the UE may configure a MAC PDU for CG2 through an additional grant 830 and may perform transmission. Here, for example, as described above, the UE may expect to perform transmission using the uplink grant 830 addressed to C-RNTI. Here, as described above, the UE may configure a MAC PDU only for LCH and a grant having high priority with respect to the uplink grant 830 addressed to C-RNTI. As another example, to guarantee URLLC data transmission, if an HARQ process ID of the corresponding uplink grant 830 is identical to an HARQ process ID of which transmission is omitted, the UE may configure a MAC PDU for data of which transmission is omitted and may perform transmission through the corresponding uplink grant 830, which is described above. Here, in FIG. 8, the HARQ process ID of which transmission is omitted may be HARQ process #2 and the HARQ process ID for the uplink grant 830 newly allocated to the UE may also be HARQ process #2. That is, as described above, since the HARQ process ID of the corresponding uplink grant 830 is identical to the HARQ process ID of which transmission is omitted, the UE may perform retransmission for a grant of which is omitted through the corresponding uplink grant 830.

Figure 9:
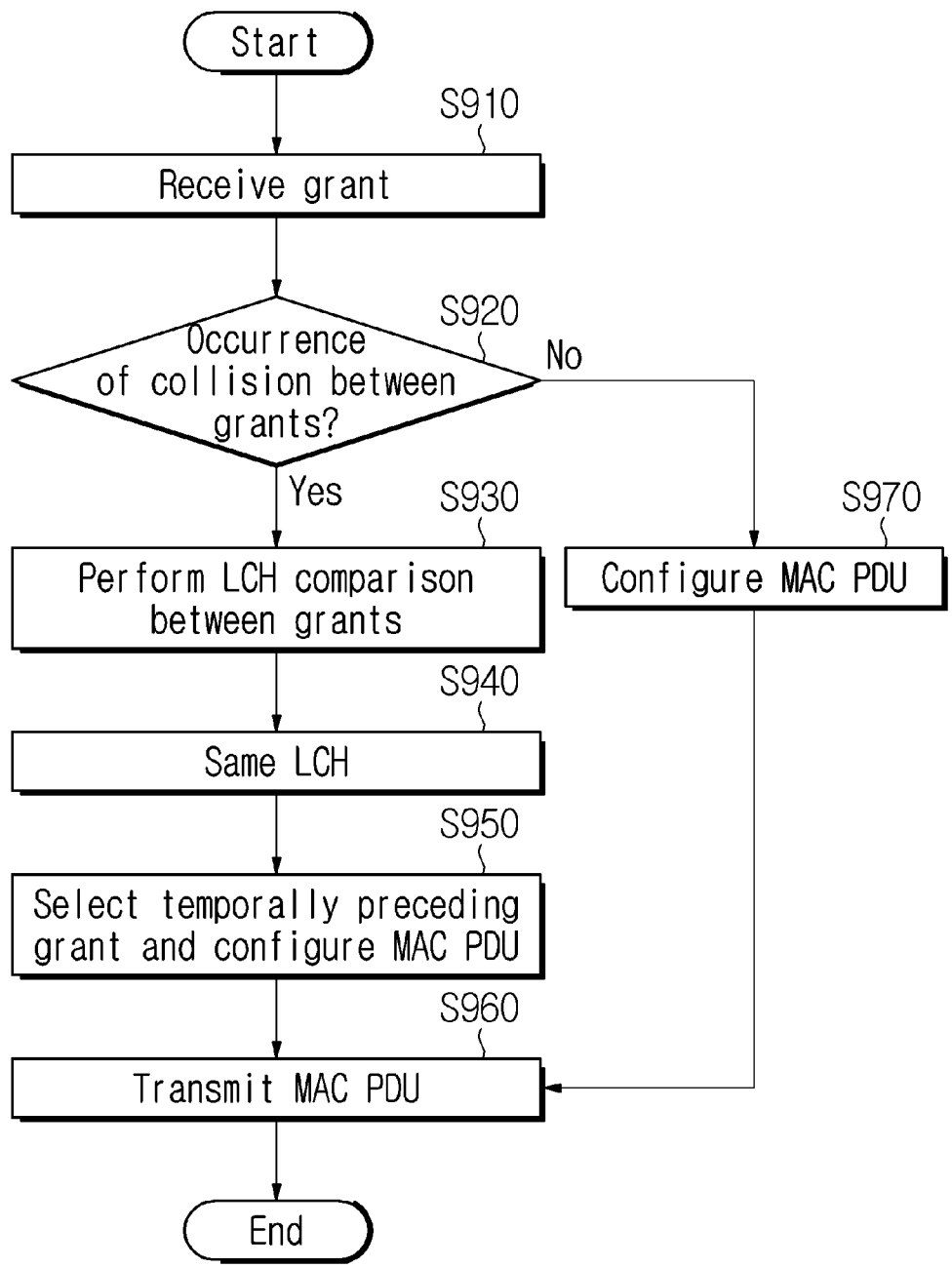
FIG. 9 is a flowchart illustrating an operation of a UE according to the present disclosure.

FIG. 9 is a flowchart illustrating an operation of a UE according to the present disclosure. For example, in operation S910, a plurality of configured grants may be configured in the UE. Here, as described above with reference to FIGS. 1 to 8, in operation S920, the UE may verify whether a collision occurs between the configured grants. Here, if the collision occurs between the plurality of configured grants, the UE may perform LCH comparison between the configured grants in operation S930. In detail, as described above, the UE may perform an LCP process to verify whether the plurality of configured grants is configured for the same service. Here, if the plurality of configured grants relates to the same LCH in operation S940, the UE may verify that the plurality of configured grants is configured for the same service. Here, as described above with reference to FIGS. 1 to 8, in operation S950, the UE may select a temporally preceding grant from among the colliding plurality of configured grants and may configure a MAC PDU. Here, as described above, the UE may not configure a MAC PDU for a configured grant of which transmission is omitted. In operation S960, the UE may transmit the configured MAC PDU, which is described above. Meanwhile, for example, as described above, unless the collision occurs between the plurality of configured grants, the UE may configure a MAC PDU for a corresponding configured grant in operation S970 and may transmit the MAC PDU.

Figure 10:
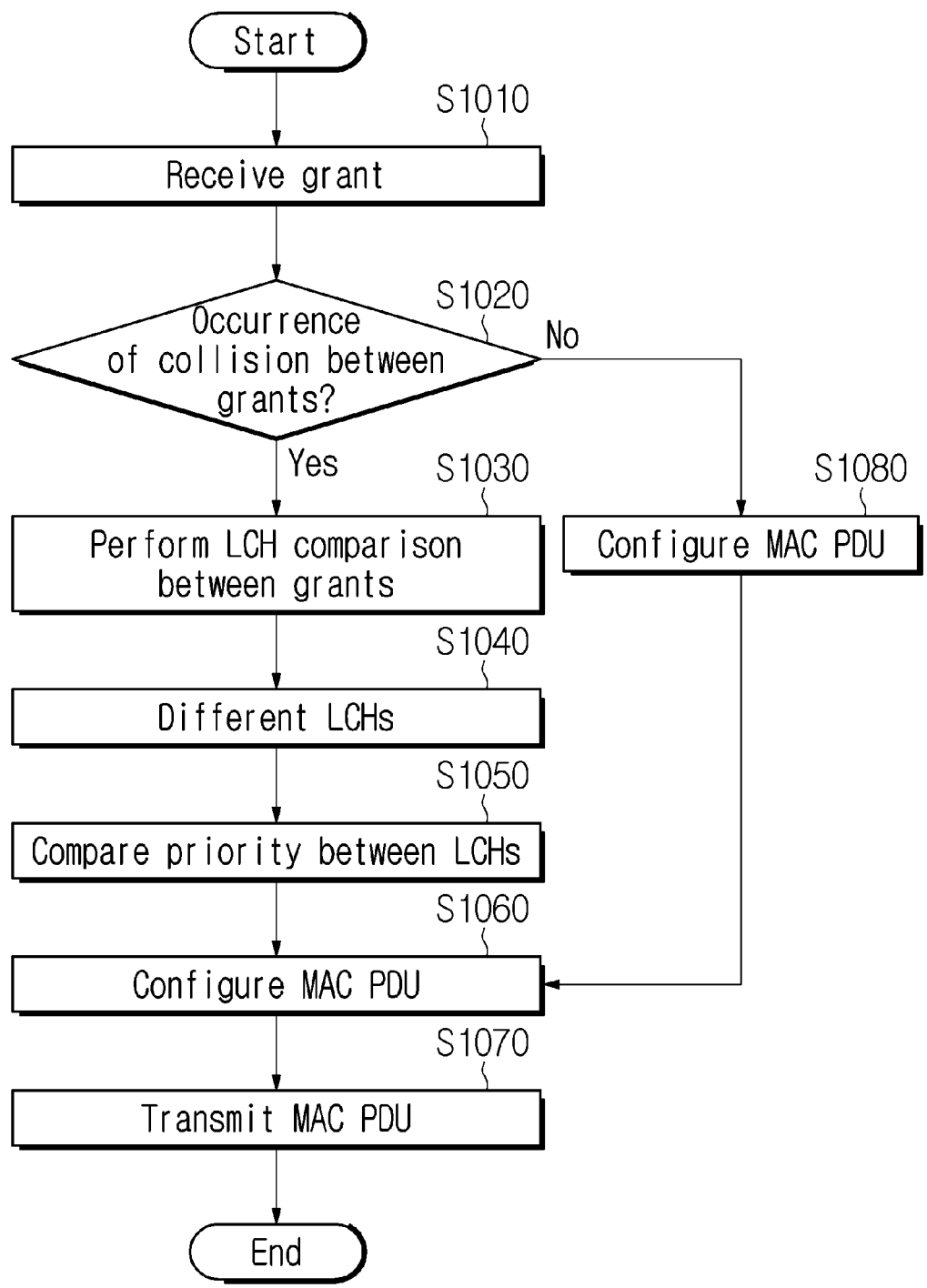
FIG. 10 is a flowchart illustrating an operation of a UE according to the present disclosure.

Also, for example, FIG. 10 is a flowchart illustrating a UE operation method in a circumstance in which a collision occurs between a plurality of configured grants according to the present disclosure. For example, in operation S1010, a plurality of configured grants may be configured in the UE. Here, as described above with reference to FIGS. 1 to 8, in operation S1020, the UE may verify whether a collision occurs between the configured grants. Here, if the collision occurs between the plurality of configured grants, the UE may perform LCH comparison between the configured grants in operation S1030. In detail, as described above, the UE may perform an LCP process to verify whether the plurality of configured grants is configured for the same service. Here, if the plurality of configured grants relates to different LCHs in operation S1040, the UE may verify that the plurality of configured grants is configured for different services. Here, as described above with reference to FIGS. 1 to 8, the UE may compare LCH priority between the colliding plurality of configured grants in operation S1050. In operation S1060, the UE may select a grant having high LCH priority and may configure a MAC PDU for the selected grant. Next, in operation S1070, the UE may transmit the configured MAC PDU. Meanwhile, for example, the UE may configure a MAC PDU for a configured grant of which transmission is omitted. For example, as described above, the UE may expect a retransmission grant by starting "configuredgrantTimer," without transmitting the configured MAC PDU. Here, the UE may perform transmission for a configured grant of which transmission is omitted through a grant allocated from the base station based on CS-RNTI. Here, as described above, since the MAC PDU is configured, the UE may immediately transmit the MAC PDU for the configured grant of which transmission is omitted, thereby preventing latency. Meanwhile, for example, as described above, unless the collision occurs between the plurality of configured grants, the UE may configure a MAC PDU for a corresponding configured grant in operation S1080 and may transmit the MAC PDU.

Figure 11:
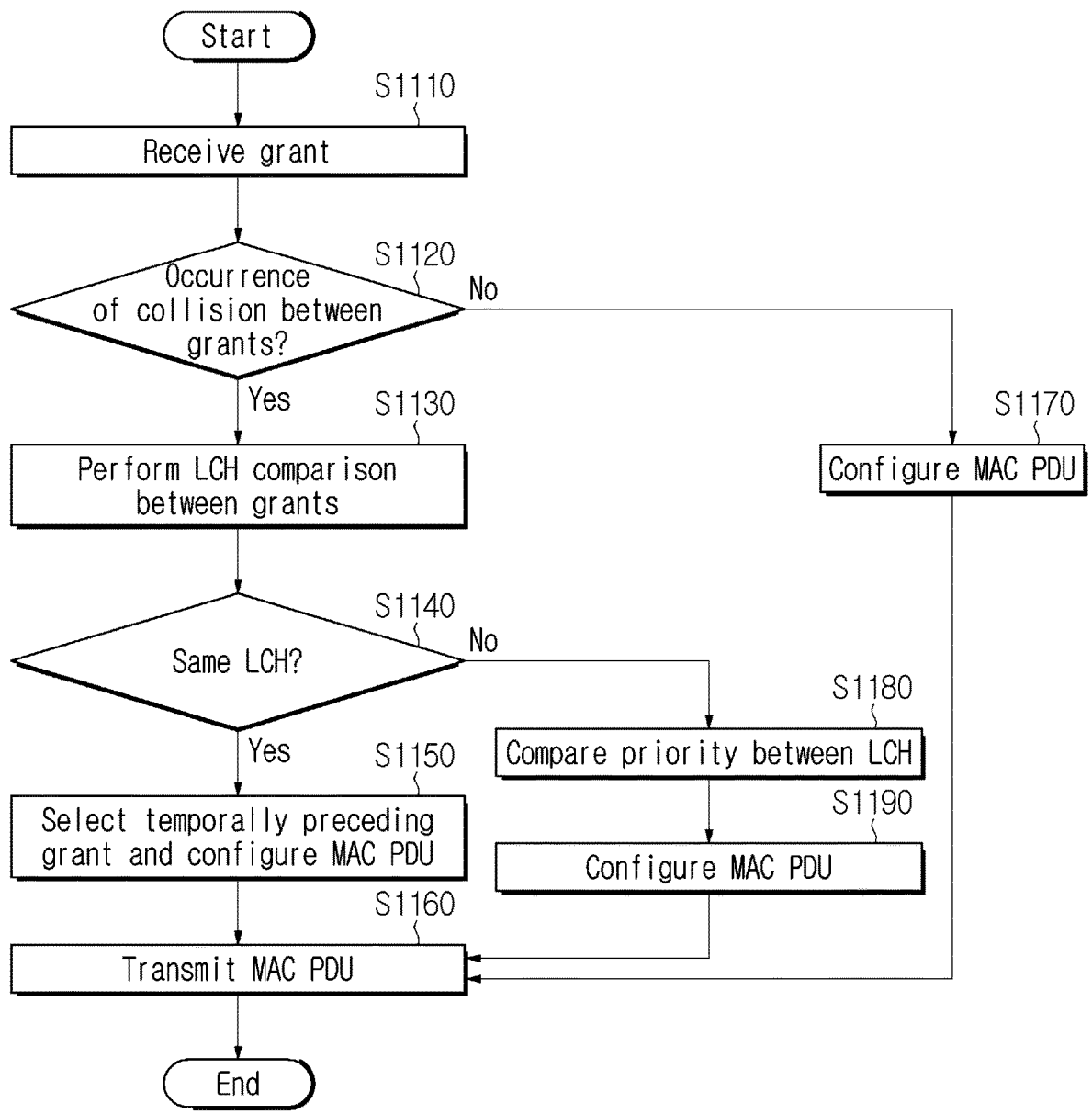
FIG. 11 is a flowchart illustrating an operation of a UE according to the present disclosure.

Also, for example, FIG. 11 is a flowchart illustrating a UE operation method in a circumstance in which a collision occurs between a plurality of configured grants according to the present disclosure. For example, in operation S1110, a plurality of configured grants may be configured in the UE. Here, as described above with reference to FIGS. 1 to 8, in operation S1120, the UE may verify whether a collision occurs between the configured grants. Here, if the collision occurs between the plurality of configured grants, the UE may perform LCH comparison between the configured grants in operation 51130. In detail, as described above, the UE may perform an LCP process to verify whether the plurality of configured grants is configured for the same service. That is, in operation S1140, the UE may verify whether the plurality of configured grants relates to the same LCH. Here, if the plurality of configured grants relates to the same LCH, the UE may select a temporally preceding configured grant and may configure a MAC PDU for the selected configured grant in operation S1150. Next, the UE may transmit the configured MAC PDU, which is described above. That is, if the plurality of configured grants is configured for the same service, the UE may configure a MAC PDU for a temporally preceding configured grant and may perform transmission. On the contrary, if a logical channel selected through the LCP process is different for each of the colliding grants in operation S1180, the UE may verify that the configured grants relate to different services. Here, in operation S1180, the UE may select a single grant to perform transmission through priority comparison between logical channels. For example, in operation S1180, the UE may configure a MAC PDU for a grant of which transmission is determined based on priority and may store the configured MAC PDU in a corresponding HARQ process. Also, although the UE may configure a MAC PDU even for a grant of which transmission is omitted based on priority and may store the configured MAC PDU in a corresponding HARQ process, the UE may expect a retransmission grant by starting "configuredgrantTimer" without performing transmission in operation S1190, which is described above. Here, if the UE receives an uplink grant addressed to CS-RNTI, the UE may immediately transmit the MAC PDU, thereby meeting requirements for URLLC data that is not transmitted due to priority. Alternatively, the UE may not configure a MAC PDU for a grant of which transmission is omitted based on priority and may perform transmission through an additional uplink grant addressed to C-RNTI in operation S1190, which is described above. Here, as described above, to transmit dropped data through a grant, if an HARQ process ID of the corresponding uplink grant is identical to an HARQ process ID of a grant of which transmission is omitted by the UE, the UE may configure and transmit a MAC PDU as data for a corresponding logical channel in view of the purpose of transmitting data of which transmission is omitted and that is dropped in operation S1160. That is, if the collision occurs between the configured grants configured for different services, the UE may support transmission of all packets, thereby meeting requirements of URLLC data. On the contrary, unless the collision occurs between the configured grants, the UE may configure a MAC PDU for a corresponding grant and may perform transmission in operation S1170, which is described above.

Figure 12:
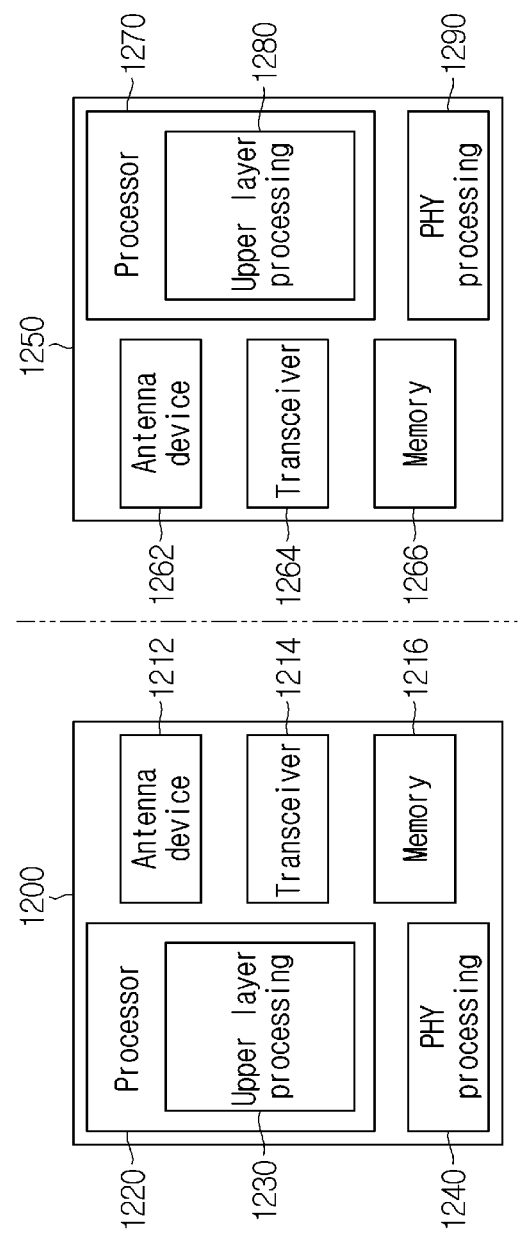
FIG. 12 is a diagram illustrating a configuration of a base station device and a terminal device according to the present disclosure.

FIG. 12 is a diagram illustrating a device configuration according to the present disclosure.

A base station device 1200 may include a processor 1220, an antenna device 1212, a transceiver 1214, and a memory 1216.

The processor 1220 may perform baseband-related signal processing and may include an upper layer processing 1230 and a physical (PHY) layer processing 1240. The upper layer processing 1230 may process an operation (e.g., uplink received signal processing and downlink transmission signal processing) of a PHY layer. The processor 1220 may also control the overall operation of the base station device 1200 in addition to performing the baseband-related signal processing.

The antenna device 1212 may include at least one physical antenna. If the antenna device 1212 includes a plurality of antennas, multiple input multiple output (MIMO) transmission and reception may be supported. The transceiver 1214 may include a radio frequency (RF) transmitter and an RF receiver. The memory 1216 may store operation processed information of the processor 1220, software, an operating system (OS), an application, etc., associated with an operation of the base station device 1200, and may include a component such as a buffer.

The processor 1220 of the base station 1200 may be configured to implement an operation of a base station in the examples described herein.

The terminal device 1250 may include a processor 1270, an antenna device 1262, a transceiver 1264, and a memory 1266. Meanwhile, for example, herein, communication between terminal devices may be performed based on uplink/downlink communication. That is, each terminal device 1250 that performs uplink/downlink communication herein may be a device that performs communication with the terminal device 1250 as well as the base station device 1200. However, it is provided as an example only.

The processor 1270 may perform baseband-related signal processing and may include an upper layer processing 1280 and a PHY layer processing 1290. The upper layer processing 1280 may process an operation of a MAC layer, an RRC layer, or more upper layers. The PHY layer processing 1290 may process an operation (e.g., downlink received signal processing and uplink transmission signal processing) of a PHY layer. The processor 1270 may control the overall operation of the terminal device 1250 in addition to performing the baseband-related signal processing.

The antenna device 1262 may include at least one physical antenna. If the antenna device 1262 includes a plurality of antennas, MIMO transmission and reception may be supported. The transceiver 1264 may include an RF transmitter and an RF receiver. The memory 1266 may store operation processed information of the processor 1270 and software, an OS, an application, etc., associated with an operation of the terminal device 1250, and may include a component, such as a buffer.

The processor 1270 of the terminal device 1250 may be configured to implement an operation of a terminal in the examples described herein.

Also, for example, as described above, the processor 1220 of the base station 1200 may configure a configured grant in the terminal device 1250. Here, as described above, the configured grant may be configured in the terminal based on type 1 or type 2.

For example, the processor 1220 of the base station 1200 may configure a configured grant of type1 in the terminal through an RRC message (or an RRC reconfiguration message). Also, the processor 1220 of the base station 1200 may provide parameter information about the configured grant to the terminal. Here, the processor 1270 of the terminal device 1250 may perform data transmission through the configured grant based on the parameter information.

Also, for example, the processor 1220 of the base station 1200 may dynamically configure a configured grant of type 2 in the terminal through a PDCCH. Here, as described above, the processor 1270 of the terminal device 1250 may perform data transmission through the configured grant.

Also, for example, as described above, the processor 1270 of the terminal device 1250 may verify whether a collision occurs between a plurality of configured grants. For example, the upper layer processing 1280 of the terminal device 1250 may verify whether the collision occurs between the plurality of configured grants. Here, the processor 1270 of the terminal device 1250 may compare logical channels for the plurality of configured grants. As described above, the processor 1270 of the terminal device 1250 may verify whether the plurality of configured grants relates to the same service. Here, as described above, with respect to the configured grants for the same service, the processor 1270 of the terminal device 1250 may configure a MAC PDU for a temporally preceding configured grant and may perform transmission. Also, for example, as described above, with respect to the configured grants for different services, the processor 1270 of the terminal device 1250 may configure a MAC PDU for a configured grant based on priority and may perform transmission.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various examples may be executed on an apparatus or a computer, and a non-transitory computer-readable medium storing such software or instructions to be executable on an apparatus or a computer.

INDUSTRIAL APPLICABILITY

The present disclosure may apply when a user equipment (UE) supporting Ultra Reliable and Low Latency Communications (URLLC) and Industrial Internet of Things (IIoT) configures a plurality of configured grants in a wireless communication system.

What is claimed is:

1. A method of performing, by a user equipment (UE), transmission in a wireless communication system, the method comprising:
   receiving, by the UE, a plurality of configured grants, wherein the receiving comprises receiving a configured grant for at least one service configured in a single bandwidth part (BWP);
   determining, by the UE, whether an overlap occurs between the plurality of configured grants, wherein the determining comprises determining whether transmission points for transmitting traffic are overlapped in time;

selecting, by the UE, a first configured grant from among a plurality of overlapped configured grants, wherein the selecting of the first configured grant is based on a priority for a logical channel corresponding to the first configured grant, wherein the priority is indicated by a radio resource control (RRC) message received from a base station, and wherein a second configured grant of the overlapped configured grants is ignored;

transmitting, using the first configured grant, traffic associated with the logical channel;

activating, by the UE, one of a first BWP or a second BWP that is indicated by a BWP indicator comprised in a Physical Downlink Control Channel (PDCCH) received from the base station; and deactivating the other one of the first BWP or the second BWP that is not indicated by the BWP indicator.

2. The method of claim 1, wherein:
the first BWP supports a plurality of services comprising a first service, a second service, and a third service;
the plurality of configured grants are associated with the plurality of services; and
at least one configured grant, of the plurality of configured grants, is configured for each of the plurality of services.

3. The method of claim 2, wherein:
the second BWP supports a fourth service and a fifth service;
the plurality of configured grants are associated with the fourth service and the fifth service; and
at least one configured grant, of the plurality of configured grants, is configured for each of the fourth service and the fifth service.

4. The method of claim 2, further comprising:
determining a transmission point, in time, of traffic for each of the plurality of services using the configured grants for the plurality of services of the first BWP respectively; and
determining whether transmission points of traffic overlap in time among the plurality of services.

5. The method of claim 1, further comprising:
receiving, from the base station and using a configured scheduling radio network temporary identifier (CS-RNTI) for retransmission of a second configured grant configured for the UE, an indication of an uplink resource; and
transmitting, using the uplink resource, traffic for a service corresponding to a dropped configured grant.

6. The method of claim 5, further comprising, for the transmitting the traffic for the service:
receiving allocation of a retransmission grant addressed to the CS-RNTI; and
determining retransmission of traffic for a corresponding service by verifying a Hybrid Automatic Repeat Request (HARQ) process identifier (ID) of the retransmission grant.

7. The method of claim 1, wherein the first configured grant configures the UE to transmit uplink data without performing a scheduling request (SR) transmission.

8. The method of claim 1, further comprising:
receiving, using a cell radio network temporary identifier (C-RNTI), an indication of an uplink resource from the base station; and
transmitting, using the uplink resource, traffic for a service corresponding to a dropped configured grant.

9. A method comprising:
receiving, by a wireless user device, a plurality of configured grants associated with a bandwidth part (BWP);

determining, by the wireless user device, whether an overlap occurs between the plurality of configured grants, wherein the determining comprises determining whether transmission points for transmitting traffic are overlapped in time;

based on overlapped configured grants of the plurality of configured grants, selecting, by the wireless user device, a first configured grant from the overlapped configured grants, wherein the selecting of the first configured grant is based on a priority associated with the first configured grant, and wherein the priority is indicated by a radio resource control (RRC) message received from a base station;

based on the first configured grant, transmitting, by the wireless user device, an uplink signal associated with the first configured grant;

after ignoring a second configured grant of the overlapped configured grants, receiving, from the base station and using a configured scheduling radio network temporary identifier (CS-RNTI) for retransmission associated with the ignored second configured grant, an indication of an uplink resource; and transmitting, using the uplink resource, an uplink signal associated with the ignored second configured grant.

10. The method of claim 9, wherein uplink resources, for Hybrid Automatic Repeat Request (HARQ) transmissions or HARQ retransmissions, are allocated via the plurality of configured grants.

11. The method of claim 9, further comprising:
receiving allocation of a retransmission grant addressed to the CS-RNTI; and
based on a Hybrid Automatic Repeat Request (HARQ) process identifier (ID) of the retransmission grant, performing retransmission of an uplink signal.

12. The method of claim 9, further comprising:
after ignoring a second configured grant of the overlapped configured grants, receiving, using a cell radio network temporary identifier (C-RNTI), an indication of an uplink resource from the base station; and
transmitting, using the uplink resource, an uplink signal associated with the ignored second configured grant.

13. The method of claim 9, wherein the first configured grant configures the wireless user device to transmit uplink data without performing a scheduling request (SR) transmission.

14. A method of performing, by a user equipment (UE), transmission in a wireless communication system, the method comprising:
receiving, by the UE, a plurality of uplink grants of a bandwidth part (BWP) of a cell, wherein the plurality of configured grants comprises:
a configured grant configured by a radio resource control (RRC) reconfiguration message; and
a second uplink grant associated with an indication via a physical downlink control channel (PDCCH);

based on a transmission time duration associated with the configured grant overlapping with a transmission time duration associated with the second uplink grant, the configured grant:
selecting the second uplink grant; and
ignoring the configured grant, wherein the ignoring of the configured grant is based on a priority for a logical channel corresponding to the configured grant, and wherein the priority is indicated by a radio resource control (RRC) message received from a base station;

transmitting, using the second uplink grant, uplink data;

after ignoring the configured grant of the overlapped configured grants, receiving, from the base station and using a configured scheduling radio network temporary identifier (CS-RNTI) for retransmission associated with the ignored configured grant, an indication of an uplink resource; and transmitting, using the uplink resource, an uplink signal associated with the ignored configured grant.

15. The method of claim 14, wherein the configured grant configures the UE to transmit uplink data without performing a scheduling request (SR) transmission.

16. The method of claim 14, wherein the configured grant is a configured grant of a first type; and wherein the second uplink grant is a configured grant of a second type.

17. The method of claim 14, further comprising:

after ignoring the configured grant, keeping data associated with the ignored configured grant;

receiving an indication of an uplink resource from the base station; and transmitting, using the uplink resource, the kept data associated with the ignored configured grant.

18. The method of claim 17, wherein the indication of the uplink resource is received using the CS-RNTI.

* * * * *